United States Patent
Kitamura

(10) Patent No.: US 7,469,397 B2
(45) Date of Patent: Dec. 23, 2008

(54) AUTOMATIC TRACE DETERMINATION METHOD AND APPARATUS FOR AUTOMATICALLY DETERMINING OPTIMAL TRACE POSITIONS ON SUBSTRATE USING COMPUTATION

(75) Inventor: Tamotsu Kitamura, Setagaya-Nagano (JP)

(73) Assignee: Shinko Electric Industries Co., Ltd., Nagano (JP)

(*) Notice: Subject to any disclaimer, the term of this patent is extended or adjusted under 35 U.S.C. 154(b) by 513 days.

(21) Appl. No.: 11/243,879

(22) Filed: Oct. 4, 2005

(65) Prior Publication Data
US 2006/0071322 A1 Apr. 6, 2006

(30) Foreign Application Priority Data
Oct. 5, 2004 (JP) .............................. 2004-292571

(51) Int. Cl.
*G06F 17/50* (2006.01)
(52) U.S. Cl. .................. 716/8; 716/9; 716/12; 716/13; 716/14
(58) Field of Classification Search .................. 716/1, 716/5, 8, 9, 12, 13, 14; 257/692
See application file for complete search history.

(56) References Cited

U.S. PATENT DOCUMENTS

| 6,226,560 B1 | 5/2001 | Hama et al. ................... 700/97 |
| 6,245,599 B1 | 6/2001 | Goto et al. | |
| 6,596,549 B2 | 7/2003 | Kitamura et al. ............... 438/6 |
| 6,938,234 B1* | 8/2005 | Teig et al. ...................... 716/12 |
| 2002/0035720 A1 | 3/2002 | Kitamura et al. | |

FOREIGN PATENT DOCUMENTS

| JP | 10-214898 | 8/1998 |
| JP | 2002-008300 | 1/2002 |
| JP | 2002-83006 | 3/2002 |

OTHER PUBLICATIONS

English language Abstract for JP 2002-83006, 2002.
English language Abstract for JP 10-214809, 1998.
Shuenn-Shi Chen et al., An Automatic Router for the Pin Grid Array Package, Design automation conference, 1999. Proceedings of the ASP-DAC 1999. Asia and South Pacific Wanchai, Hong Kong Jan. 18-21, 1999, Piscataway, New Jersey, USA, IEEE, US, Jan. 18, 1999, pp. 133-136, XP-010326313.
European Search Report dated Dec. 8, 2006 for Application No. 05256201.4-2224.

* cited by examiner

*Primary Examiner*—Sun J Lin
(74) *Attorney, Agent, or Firm*—Morgan & Finnegan, LLP

(57) ABSTRACT

An automatic trace determination apparatus for automatically determining optimal positions of traces from pads to corresponding vias on a substrate using computation comprises: tentative determination means for tentatively determining a tentative target line with which tentative positions of bending points of traces are aligned; and final determination means for determining a final target line by correcting the tentative target line so that at least clearances between the adjacent traces and between the traces and vias adjacent to the corresponding traces can be secured, wherein the positions of intersection of the determined final target line and the traces from the pads are determined as bending points of the traces.

11 Claims, 22 Drawing Sheets

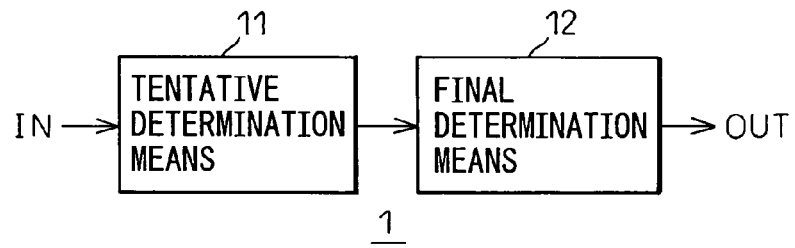
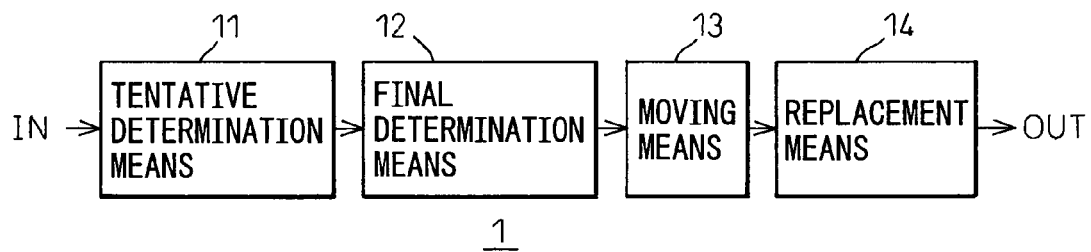
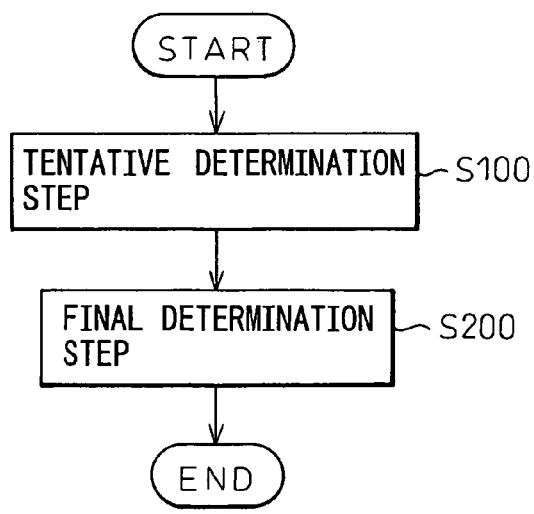

Fig.22
 ⋯ VIA
 ⋯ PAD
 ⋯ TRACE

AUTOMATIC TRACE DETERMINATION METHOD AND APPARATUS FOR AUTOMATICALLY DETERMINING OPTIMAL TRACE POSITIONS ON SUBSTRATE USING COMPUTATION

BACKGROUND OF THE INVENTION

1. Field of the Invention

The present invention relates to an automatic trace determination method and apparatus for determining optimal trace positions from pads to corresponding vias on a substrate.

2. Description of the Related Art

In a semiconductor package such as PBGA and EBGA, electrode terminals of a semiconductor chip are electrically connected with pads (for example, bonding pads or flip-chip pads) and the pads are connected with vias (a land), and the vias are also connected with each other by traces (i.e., signal traces). Traces in the semiconductor package at least have to satisfy design rules in that clearances between traces and so on can be secured and there is no unnecessary trace crossing. For example, a designer typically designs a wiring route of a semiconductor package by trial and error on a virtual plane using a CAD system.

For example, Japanese Unexamined Patent Publication No. 2002-08300 discloses an exemplary wiring pattern design method in which only a wiring route is determined in advance in a rough wiring process and, then, in a trace formation process, traces are provided uniformly by checking clearances (lines and spaces) according to actual design rules.

Further, for example, Japanese Unexamined Patent Publication No. 10-214898 discloses a wiring method that adopts an any-angle wiring so that a wiring area can be utilized efficiently and, at the same time, clearances between the wirings and widths of the wirings can be increased in a free region.

If wirings in a semiconductor package at least satisfy design rules, it can be said that a certain measure of success is achieved. In effect, however, it is often required not only that the wiring pattern satisfies the design rules but also that the wiring pattern is a "visually beautiful pattern" that is arranged with order and regularity.

FIG. 20 is a diagram illustrating an example of traces arranged on a substrate without order and regularity, and FIG. 21 is a diagram illustrating an example of traces arranged on a substrate with order and regularity. Hereinafter, when traces are shown in the accompanying figures, the shown traces are at least a portion of the traces on the substrate. Further, FIG. 22 describes legends of symbols for vias, pads and traces indicated in the figures attached to this specification. Hereinafter, the legends of FIG. 22 apply to the figures showing the vias, pads and/or traces.

In comparison with the traces shown in FIG. 20, the traces shown in FIG. 21 are bent at bending points that are arranged in a line with some regularity and the number of the bending points is less than that in the case of FIG. 20. Further, the traces shown in FIG. 21 are well balanced with left-to-right symmetry. On the other hand, the wirings shown in FIG. 20 do not have remarkable symmetry and have even nonuniformity of integration density.

In comparison with the wiring pattern without regularity as shown in FIG. 20, the wiring pattern arranged with order and regularity as shown in FIG. 21 has shorter wiring length and, therefore, it can be more economical and it can be manufactured more easily and it has a lower rate of occurrence of failure in the manufacturing process. Further, it is electrically stable. Still further, in the substrate in which the wiring pattern is well balanced, which is deformed substantially uniformly even when it is deformed, for example, due to heat, defects such as a short circuit or breaking of traces is not likely to occur. Moreover, the semiconductor packages having the wiring pattern with order and regularity to some extent are visually more beautiful and, as a result, often advantageous when selling the semiconductor packages.

Typically, a designer designs a wiring route of a semiconductor package by trial and error on a virtual plane while actually manipulating a CAD system depending on own experience and intuition. FIGS. 23-26 are diagrams for describing a specific example of a related-art manual pattern design by trial and error. In this specification, hereinafter, V is a reference symbol of vias, a character B combined with a numeral such as 1 or 2 is a reference symbol of pads, and a character W combined with a numeral such as 1 or 2 is a reference symbol of signal traces (wires). Further, a virtual check line used for checking clearances (lines and spaces) between traces or between traces and vias is referred to as a clearance check circle that is designated by alternate long and short dashed lines in the figures.

Typically, in fan-in/out wirings, considering a subsequent solder resist process, traces W1-W6 are drawn out at a minimum in the same direction as the pads B1-B6. The length of the trace drawn out at a minimum in the same direction as the corresponding pad is referred to as the "minimum length", in this specification. For convenience, a portion of the trace drawn out from the corresponding pad having the "minimum length" is particularly referred to as the "minimum trace". In fan-in/out wirings, because a solder resist is applied around the pads, a bending point cannot be provided in a region along the minimum length from the pad and the trace can be bent only at a position remote from the pad by the minimum length or more.

Typically, as semiconductor packages are miniaturized and integrated more and more, the clearances between pads and vias tend to become narrower.

For example, as illustrated in FIG. 23, when bending points are provided while securing clearances between the minimum traces, each minimum trace may be extended appropriately so that the bending points can be aligned substantially in a line (as shown by a dotted line in the figure). However, in the example of FIG. 23, the clearance between the trace W6 and the via V cannot be secured sufficiently and, as a result, a clearance error will occur.

Further, for example, as shown in FIG. 24, when bending points are provided on traces that are separated from each other by a minimum clearance to secure the distance between the trace W4 and the via V, the bending points are not aligned in a line regularly because the pads are not arranged equidistantly.

Also, when the pads have an elliptical shape and the pads are not oriented in an identical direction, a clearance error may occur. For example, as shown in FIG. 25, when the pad B3 is oriented in the direction to approach the pads B2, if the wiring pattern is designed unnaturally so that the bending points are aligned in a line (as shown by a dotted line in the figure), the clearance between the traces W2 and W3 cannot be secured sufficiently and a clearance error will occur. On the other hand, for example, as shown in FIG. 26, when the pad B3 is oriented in the direction to be separated from the pad B2, if the wiring pattern is designed unnaturally so that the bending points are aligned in a line (as shown by a dotted line in the figure), the clearance between the traces W3 and W4 cannot be secured sufficiently and a clearance error will occur.

At present, in order to manually design a so-called "beautiful pattern", a designer has to design by trial and error according to his own judgment so that the bending points can be aligned in a line and the pattern can be well balanced as much as possible, while securing the necessary clearances.

In such manual pattern design by trial and error in the related-art, even if a wiring pattern with order and regularity is achieved, design quality and time required for design greatly depend on the designer's skill, experience, intuition and the like. Also, in manual pattern design by trial and error, as the required pattern becomes more complicated, the effort, time and difficulty for achieving the wiring pattern with order and regularity is increased. Further, unevenness in quality of finished products is also increased. In reality, because the manual pattern design by trial and error requires a half or full day's work and it is not economical to waste further time for pattern designing, the designer has to compromise with a certain design quality.

In view of the above problems, it is an object of the present invention to provide an automatic trace determination method and apparatus for automatically determining optimal trace positions using computation so that traces from pads to corresponding vias on a substrate can have order and regularity.

SUMMARY OF THE INVENTION

In order to achieve the above object, according to the present invention, an arithmetic processing unit such as a computer is used for virtually assuming a target line with which bending points where traces are bent should be aligned first and, then, determining the positions of intersection of the line and the traces from the pads satisfying the specified conditions as the bending points of the traces. The computer also performs determination of the specified conditions. When the bending points of the traces are positioned on the line that satisfies the specified conditions so that the traces are bent at such respective bending points, the wiring pattern becomes a "beautiful" pattern with order and regularity. Thus, according to the present invention, the wiring pattern with order and regularity can be determined automatically by computation and, according to a variation of the present invention, the designer's intention may be reflected to some extent.

FIG. 1 is a principal block diagram of an automatic trace determination apparatus according to a first embodiment of the present invention. Hereinafter, like reference numerals designate elements having like functions throughout the several views.

According to a first embodiment of the present invention, an automatic trace determination apparatus 1 for automatically determining optimal positions of traces from pads to corresponding vias on a substrate using computation comprises: tentative determination means 11 for tentatively determining a tentative target line with which tentative positions of bending points of traces are aligned; and final determination means 12 for determining a final target line by correcting the tentative target line so that at least clearances between adjacent traces and between traces and vias adjacent to the corresponding traces can be secured. The automatic trace determination apparatus 1 determines the positions of intersection of the determined final target line and the traces from the pads as bending points of the traces.

FIG. 2 is a principal block diagram of an automatic trace determination apparatus according to a second embodiment of the present invention. In the second embodiment, moving means 13 and replacement means 14 are added to the apparatus of the first embodiment.

Thus, according to the second embodiment of the present invention, an automatic trace determination apparatus 1 further comprises: moving means 13 that, when clearances between traces passing through bending points on a target line specified arbitrarily and adjacent vias cannot be secured, moves the specified target line in the opposite direction to that in which the minimum traces are drawn out so that at least the clearances can be secured; and replacement means 14 that replaces a portion of the final target line determined by the final determination means 12 with a portion of the specified target line that can secure the clearances or that is moved to secure at least the clearances that cannot be otherwise secured and that is farther from the pads in the direction in which the minimum traces are drawn out than the final target line determined by the final determination means 12 and determines the latter as a portion of a new final target line.

The tentative determination means 11, the final determination means 12, the moving means 13 and the replacement means 14 in the automatic trace determination apparatus 1 can be implemented in the form of software that can be operated by an arithmetic processing unit such as a computer. An apparatus for performing the above-mentioned operations and a program for allowing the computer to operate the above-mentioned operations can be implemented by those skilled in the art who understand the following description. Further, it is evident to those skilled in the art that the program for allowing the computer to operate the above-mentioned operations may be stored in storage media.

BRIEF DESCRIPTION OF THE DRAWINGS

The present invention will be more clearly understood from the description as set below with reference to the accompanying drawings, wherein:

FIG. 1 is a principal block diagram of an automatic trace determination apparatus according to a first aspect of the present invention;

FIG. 2 is a principal block diagram of an automatic trace determination apparatus according to a second aspect of the present invention;

FIG. 3 is a flow chart showing an operational flow of an automatic trace determination method according to a first embodiment of the present invention;

FIG. 22 is a diagram for describing symbols representing a via, a pad and a trace used in the accompanying drawings of this specification;

DESCRIPTION OF THE PREFERRED EMBODIMENTS

FIG. 3 is a flow chart showing an operational flow of an automatic trace determination method according to a first embodiment of the present invention.

First, in a tentative determination step S100, a tentative target line with which tentative positions of bending points where traces are bent are aligned is determined tentatively. Next, in a final determination step S200, a final target line is generated by correcting the tentative target line so as to secure at least clearances between adjacent traces and clearances between traces and vias adjacent to the traces. Then, a position of intersection of the final target line and a trace from a pad is determined as a bending point of the trace.

The tentative determination step S100 and the final determination step S200 in the automatic trace determination method according to the first embodiment of the present invention is performed by a processor such as a computer. In this connection, before performing the tentative determination step S100, data about coordinates, shapes, sizes and orientations of the pads on the substrate, and coordinates, shapes, sizes and orientations of the vias, as well as traces from chip pads of a semiconductor chip to corresponding pads and the like is input in advance to the processor for performing the automatic trace determination method according to this embodiment. The processor performs each process using the input data mentioned above.

Figure 4:
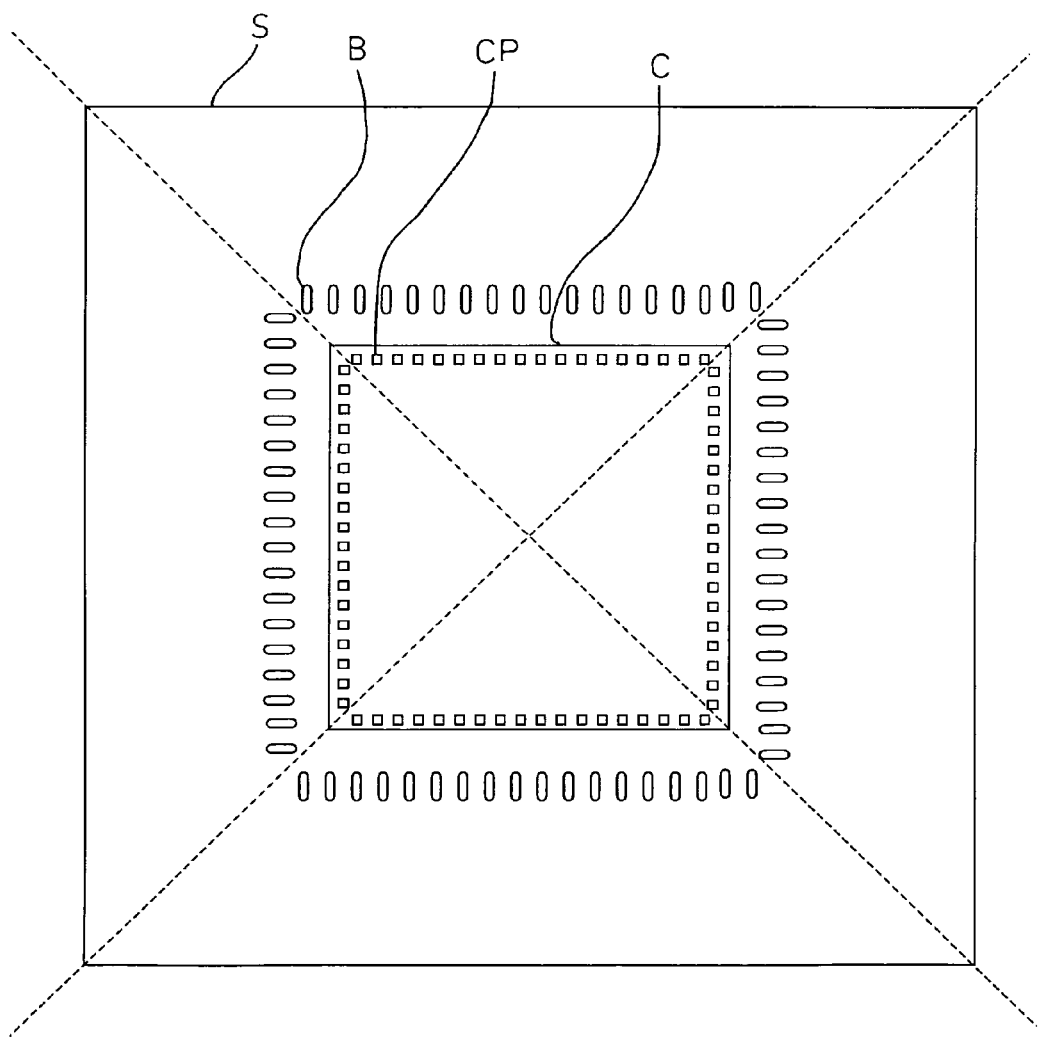
FIG. 4 is a diagram showing an exemplary pad arrangement on a substrate of a semiconductor package.

Here, the substrate of the semiconductor package will be described briefly. FIG. 4 is a diagram showing an exemplary pad arrangement on a substrate of a semiconductor package. In the shown example, a semiconductor chip C is mounted, for example, in the vicinity of the center of a substrate S of the semiconductor package. The semiconductor chip C has, for example, a rectangular shape and, correspondingly, chip pads CP are arranged in a rectangular configuration. The pads B are typically placed at the positions substantially corresponding to the chip pads CP so that the chip pads CP can be connected with the corresponding pads B via traces (wires). Therefore, the pads are divided into four groups on the substrate S. In the example shown in FIG. 4, the four groups of the pads are divided by diagonal lines (designated by dotted lines) of the semiconductor chip C. In the automatic trace determination method according to this embodiment, the tentative determination step S100 and the final determination step S200 are performed for each group of the pads. Therefore, before performing the tentative determination step S100, a CAD system should divide an array of the pads into four groups in virtual space.

Figure 5:
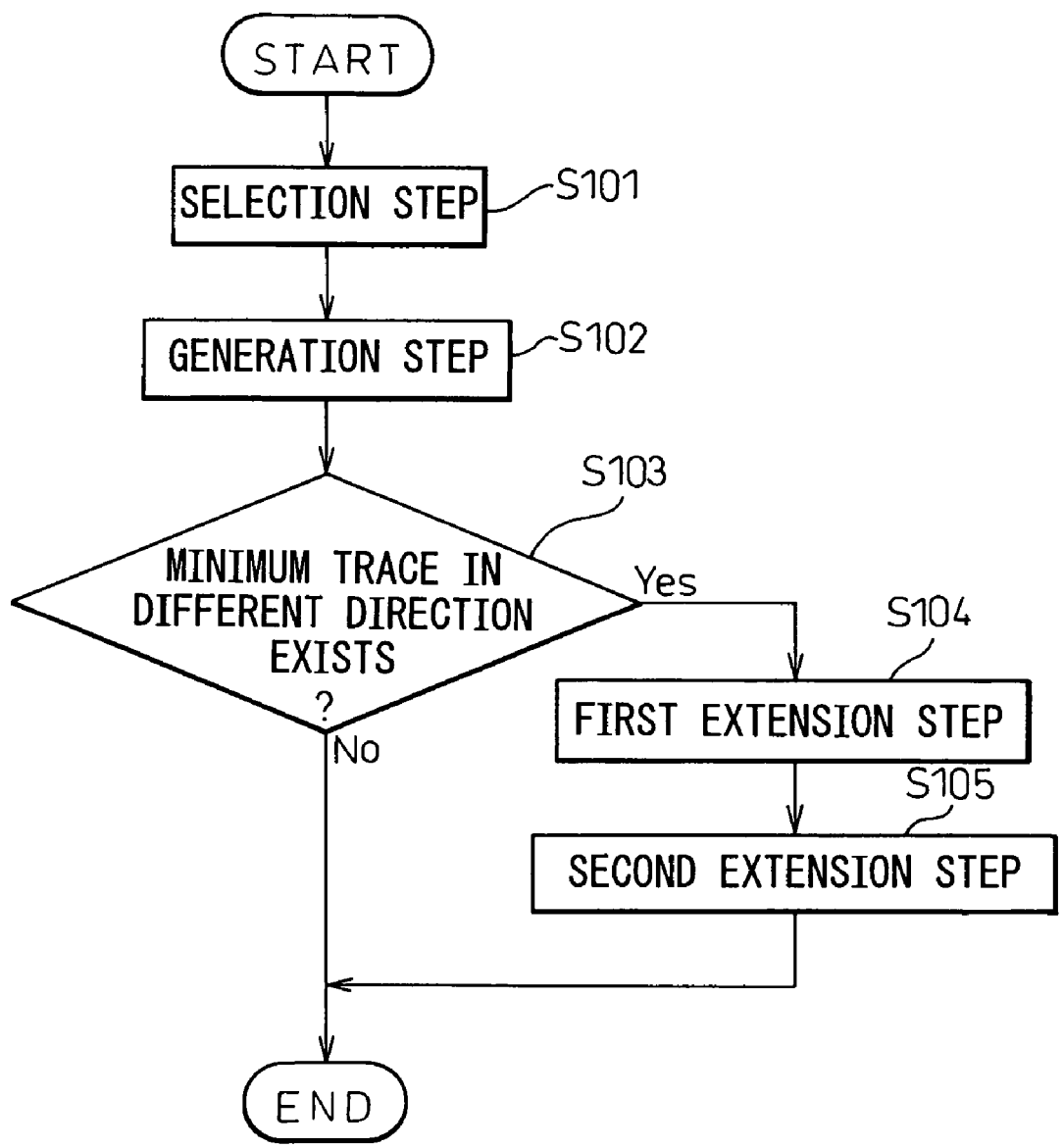
FIG. 5 is a flow chart showing an operational flow of a tentative determination step in the automatic trace determination method in the first embodiment of the present invention.

First, an operation of the tentative determination step in the first embodiment of the present invention will be described. FIG. 5 is a flow chart showing an operational flow of the tentative determination step in the automatic trace determination method in the first embodiment of the present invention. In the tentative determination step S100, a tentative target line with which tentative positions of bending points where traces are bent are aligned is determined tentatively.

First, in a selection step S101 in FIG. 5, when coordinates of the end portions of specific minimum traces drawn out in a specific identical direction from respective pads with respect to the direction in which the minimum traces are drawn out are defined as those of the highest points, segments that connect the highest points and that are farthest from the pads with respect to the direction in which the minimum traces are drawn out are selected. Then, in a generation step S102, a tentative target line is generated by connecting the segments selected in the selection step S101. Here, for example, when the chip pads are placed at the center of the substrate and the pads (bonding pads) are placed around the chip pads, "the direction in which the minimum traces are drawn out" means "the direction from the center to the circumference of the substrate".

The reason why the tentative target line is generated through the operation of the selection step S101 and the generation step S102 described above is as follows. In fan-in/out patterns, in which a solder resist is applied in the vicinity of the pads, bending points cannot be provided along the length of the minimum drawn traces from the pads and the traces can be bent only "at the positions far from the respective pads by the length of the minimum length of the traces or more". At this time, the positions farther from the respective pads than the highest points that are the end portions of the minimum traces drawn from the respective pads with respect to the direction in which the minimum traces are drawn out satisfy the condition of "the positions far from the respective pads by the length of the minimum traces or more". Therefore, when the bending points are aligned with the segments that connect the highest points and that are farthest from the pads with respect to the direction in which the minimum traces are drawn out, the fan-in/out pattern is likely to be a "beautiful pattern", though there is still the problem in securing the clearance from the adjacent traces or vias. For this reason, in the present invention, the tentative target line with which the tentative positions of the bending points should be aligned is generated by connecting the segments selected in the selection step S101 as described above.

Specific examples of the generation of the tentative target line in the selection step S101 and the generation step S102 are shown in FIGS. 6A, 6B, 6C and 7.

Figure 6A:
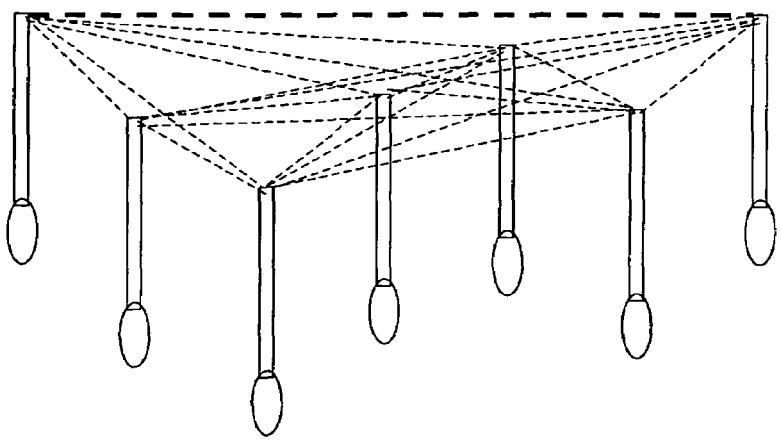
FIGS. 6A, 6B and 6C are diagrams showing specific examples of a tentative target line generated in the tentative determination step in the automatic trace determination method according to the first embodiment of the present invention.
Figure 6B:
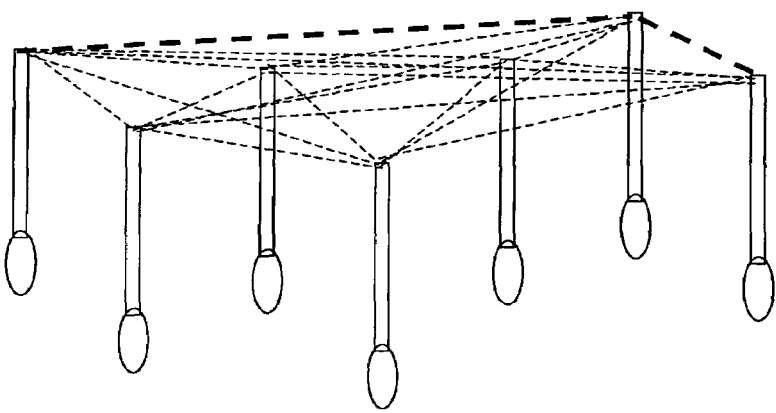
Figure 6C:
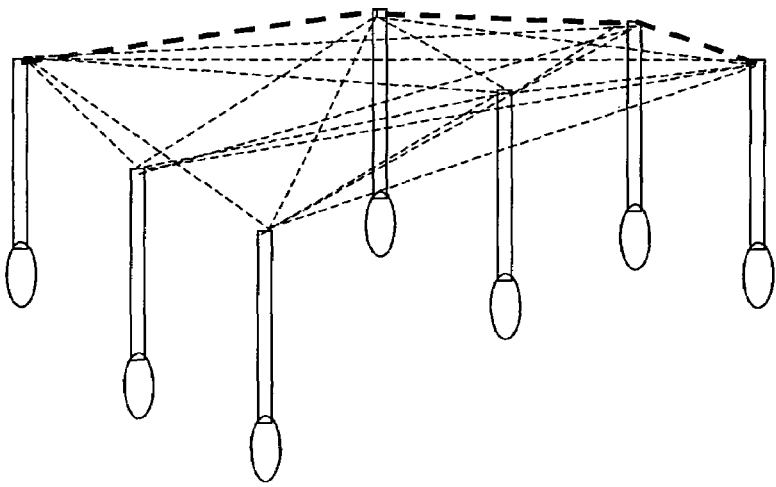

FIGS. 6A, 6B and 6C are diagrams showing specific examples of the tentative target line generated in the tentative determination step of the automatic trace determination method according to the first embodiment of the present invention. In the figures, the segments between the highest points are designated by dotted lines. Among these segments designated by the dotted lines, the segments that are farthest from the respective pads in the direction in which the minimum traces are drawn out are designated by bold dotted lines and, therefore, the tentative target line is generated by connecting the segments designated by the bold dotted lines.

Figure 7:
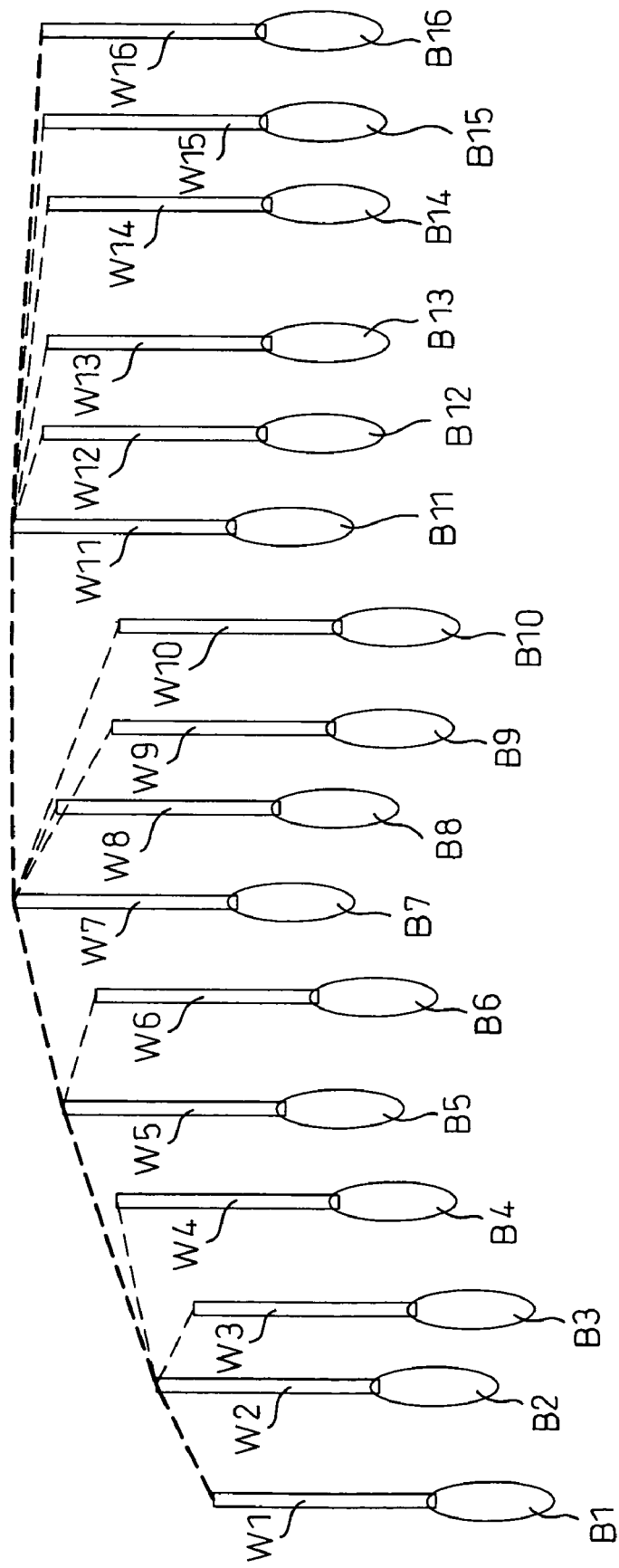
FIG. 7 is a diagram showing a further example of a tentative target line generated in the tentative determination step in the automatic trace determination method in the first embodiment of the present invention.

Further, FIG. 7 is a diagram showing a further specific example of the tentative target line generated in the tentative determination step of the automatic trace determination method according to the first embodiment of the present invention.

The segment between the highest point of the minimum trace W1 drawn from the pad B1 and the highest point of the minimum trace W2 drawn from the pad B2 is farthest from the pads with respect to the direction in which the minimum traces are drawn out and, therefore, it is included in the tentative target line (hereinafter designated by a bold dotted line in the figures).

The highest point of the minimum trace W3 is located at a position nearer to the pads than the segment between the highest point of the minimum trace W2 and the highest point of the minimum trace W4 with respect to the direction in which the minimum traces are drawn out. Also, the highest point of the minimum trace W4 is located at a position nearer to the pads than the segment between the highest point of the minimum trace W2 and the highest point of the minimum trace W5 with respect to the direction in which the minimum traces are drawn out. Therefore, the segment between the highest point of the minimum trace W2 and the highest point of the minimum trace W3 and the segment between the highest point of the minimum trace W2 and the highest point of the minimum trace W4 are not included in the tentative target line but the segment between the highest point of the minimum trace W2 and the highest point of the minimum trace W5 is included in the tentative target line.

Similarly, the segment between the highest point of the minimum trace W5 and the highest point of the minimum trace W6 is nearer to the pads than the segment between the highest point of the minimum trace W5 and the highest point of the minimum trace W7 with respect to the direction in which the minimum traces are drawn out and, therefore, it is not included in the tentative target line. On the other hand, the segment between the highest point of the minimum trace W5 and the highest point of the minimum trace W7 is included in the tentative target line.

The above operation is performed for each minimum trace to generate the tentative target line.

Returning to FIG. 5, following the generation step S102 described above, in step S103, it is determined whether the direction in which the minimum trace is drawn out from the pad differs from the direction of the minimum traces used in the selection step S101 and the generation step S102 for generating the tentative target line or not.

If it is determined that the direction is different in step S103, in a first extension step S104, the minimum trace drawn out to the different direction is extended in such direction as much as possible so long as the clearance from other minimum traces can be maintained.

After that, in a second extension step S105, the minimum trace extended in the first extension step S104 is bent at a position where the clearance can be maintained in the direction identical to that of the minimum traces used in the selection step S101 and the generation step S102 and, then, the bent trace is further extended up to the tentative target line in parallel with the traces used in the selection step S101 so that the clearance from them can be maintained.

Figure 8:
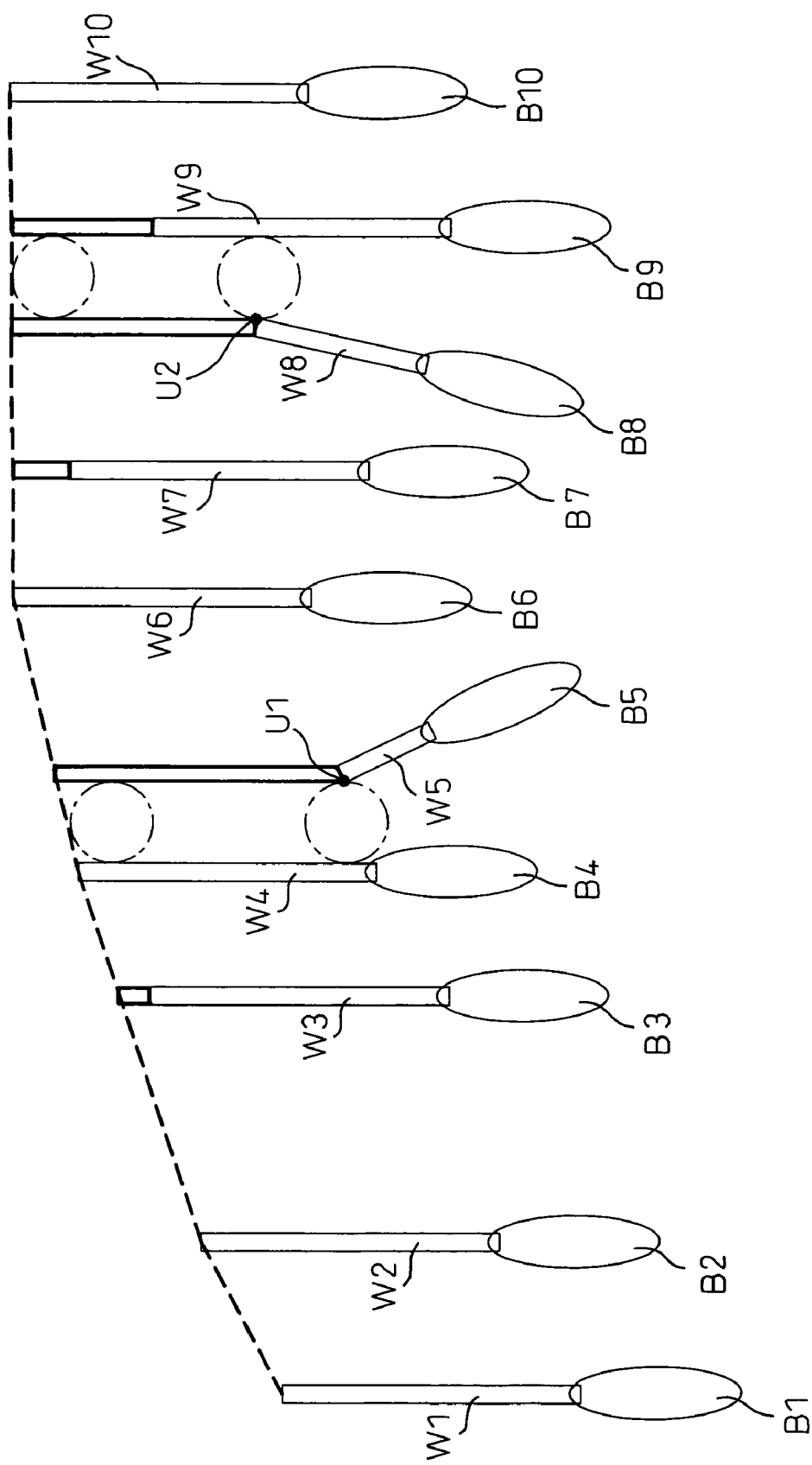
FIG. 8 is a diagram for describing a specific process of first and second extension steps in the automatic trace determination method in the first embodiment of the present invention.

FIG. 8 is a diagram for describing specific operations of the first and second extension steps in the automatic trace determination method according to the first embodiment of the present invention. In the figures, bold dotted lines designate the tentative target line and alternate long and short dashed lines designate clearance check circles.

The traces W5 and W8 are drawn out from the pads 5 and 8, respectively, in the directions different from that of the minimum trace used in the selection step S101 and the generation step S102 or, in other words, used for generating the tentative target line (for example, the trace W4). Therefore, if these traces W5 and W8 are extended in this direction, the clearances from adjacent traces cannot be maintained. In order to address this problem, considering the clearance check circles designated by alternate long and short dashed lines in the figure, first, the trace W5 is extended up to the farthest position U1 where the clearance from the forward adjacent trace W4 can be maintained. Then, at the above-mentioned position U1, the extended trace W5 is bent in the same direction as the trace W4. After that, the trace W5 is further extended up to the tentative target line (designated by a bold dotted line in the figure) in parallel with the trace W4 so that the clearance from the trace W4 can be maintained. Similarly, the trace W8 is extended up to the farthest position U2 where the clearance from the forward adjacent trace W9 can be maintained. Then, at the above-mentioned position U2, the extended trace W8 is bent in the same direction as the trace W9. After that, the trace W8 is further extended up to the tentative target line (designated by a bold dotted line in the figure) in parallel with the trace W9 so that the clearance from the trace W9 can be maintained.

The tentative positions of the bending points of the traces are aligned with the tentative target line generated in the tentative determination step S100 described above. If the traces are bent at the positions on the tentative target line, the obtained trace pattern is arranged with order and regularity. However, in this case, the clearances from the adjacent traces or vias cannot be secured sufficiently. After the tentative determination step S100, the final determination step S200 corrects the tentative target line appropriately in consideration of this clearance issue. In the final determination step S200, the final target line is generated by correcting the tentative target line so that at least the clearances between adjacent traces and the clearances between traces and vias adjacent to the traces can be secured.

First, a correcting operation for securing the clearances between adjacent traces in the final determination step S200 will be described.

Figure 9:
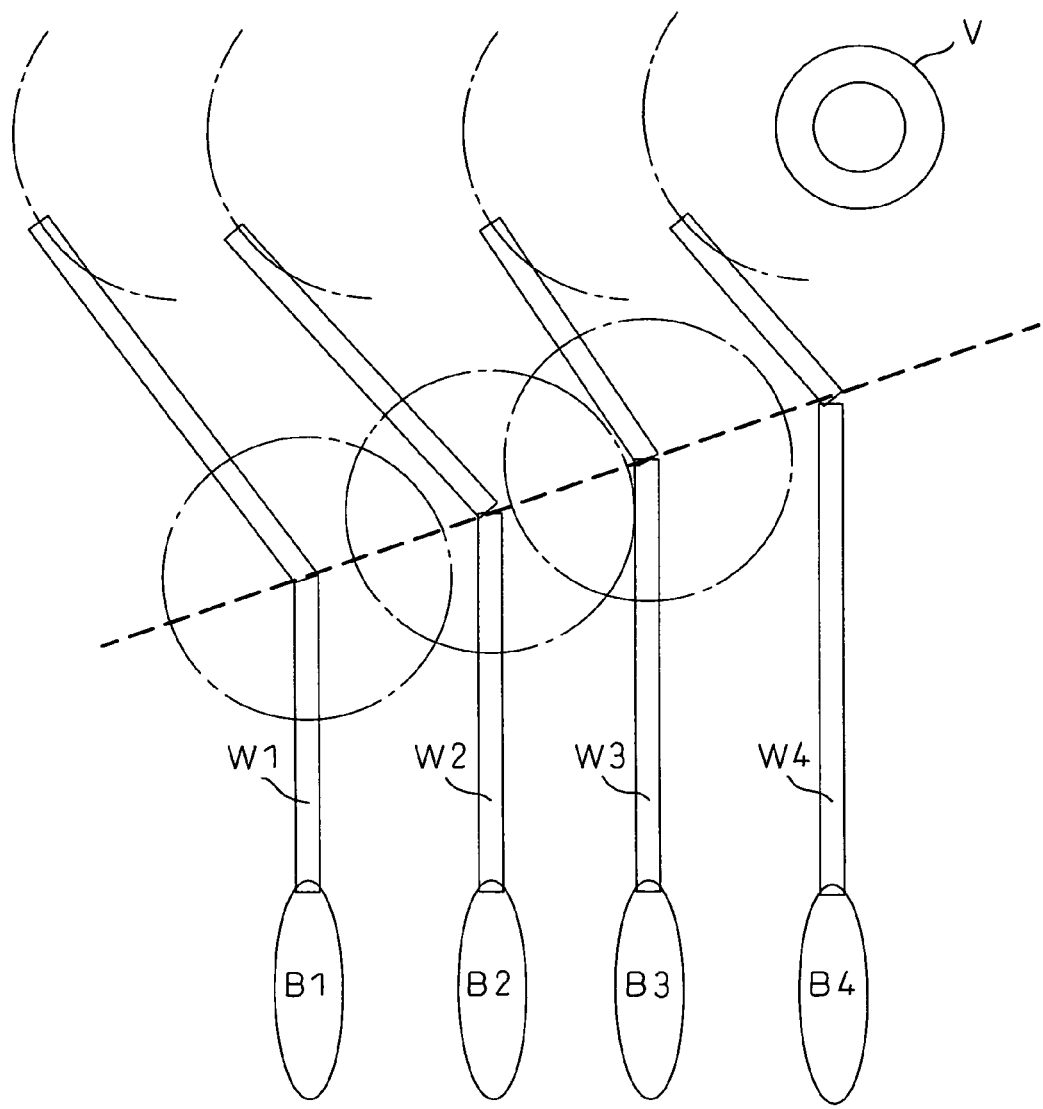
FIG. 9 is a diagram for describing clearances between adjacent traces near bending points on the tentative target line.

FIG. 9 is a diagram for describing clearances between adjacent traces in the neighborhood of bending points on the tentative target line. In the figure, alternate long and short dashed lines designate clearance check circles. When the minimum traces are bent at the bending points on the tentative target line generated in the tentative determination step S100, there occurs a problem whether the clearances between adjacent traces can be secured or not. Considering the case in which the traces are bent at the bending points on the tentative target line as shown in FIG. 9, the clearance between the traces W1 and W2 and the clearance between the traces W3 and W4 are secured sufficiently but the clearance between the traces W2 and W3 in the neighborhood of the bending points is not sufficient. Therefore, it is preferable not to bend the traces at such bending points on the tentative target line. Thus, an operation for correcting the tentative target line is performed as described below.

Figure 10:
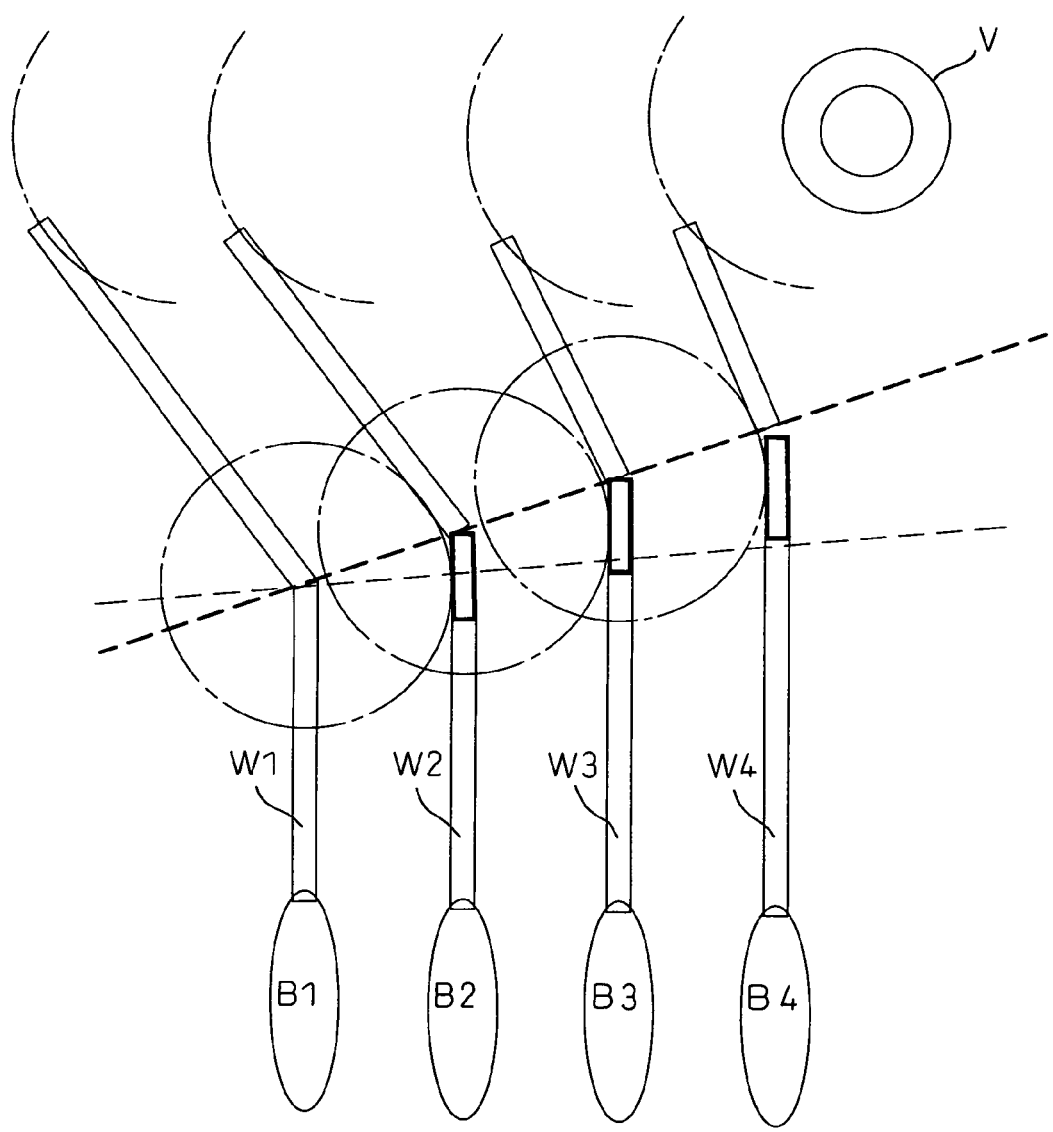
FIG. 10 is a diagram for describing a principle of a correction operation for securing clearances between adjacent traces in a final determination step in the automatic trace determination method according to the first embodiment of the present invention.

FIG. 10 is a diagram for describing a principle of a correction operation for securing clearances between adjacent traces in the final determination step in the automatic trace determination method according to the first embodiment of the present invention. It is assumed that the tentative target line (designated by a dotted line) is provided in advance as shown. Circles designated by alternate long and short dashed lines are obtained in the figure by drawing clearance check circles so that at least minimum necessary clearances can be secured between traces. In this case, the clearances can be secured by extending the traces W1-W4 up to new bending points where the minimum necessary clearances can be secured after bending the traces. Therefore, a correction operation is performed so that the tentative target line is moved to the position of the line (designated by a bold dotted line in the figure) with which the new bending points are aligned.

Figure 11:
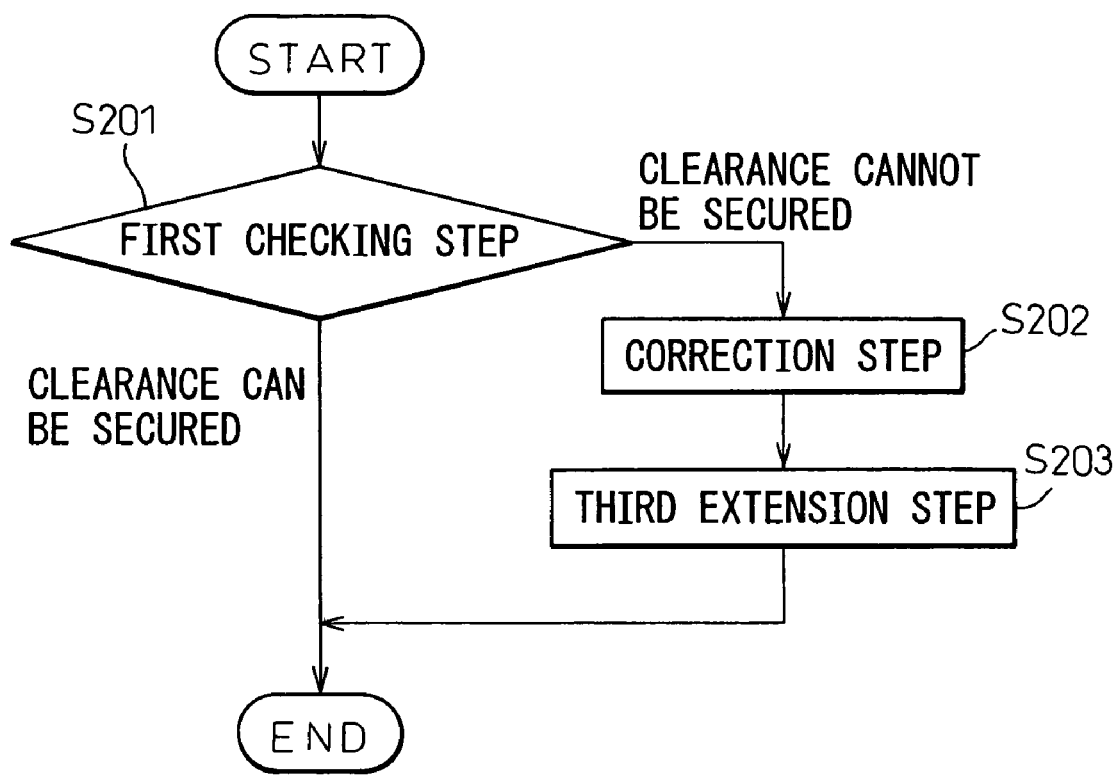
FIG. 11 is a flow chart showing an operational flow of a correction operation for securing clearances between adjacent traces in a final determination step in the automatic trace determination method according to the first embodiment of the present invention.

FIG. 11 is a flow chart showing an operational flow of the correction operation for securing clearances between adjacent traces in a final determination step in the automatic trace determination method according to the first embodiment of the present invention. First, in a first checking step S201, when the minimum traces are bent at bending points on the tentative target line, it is determined whether clearances between adjacent traces can be secured or not. If it is determined that the clearances between the adjacent traces cannot be secured in the first checking step S201, in a correction step S202, the tentative target line is moved in the direction in which the minimum traces are drawn out so that at least the clearances can be secured at the bending points. Then, in a third extension step S203, the minimum traces are extended up to the tentative target line corrected in the correction step.

Figure 12:
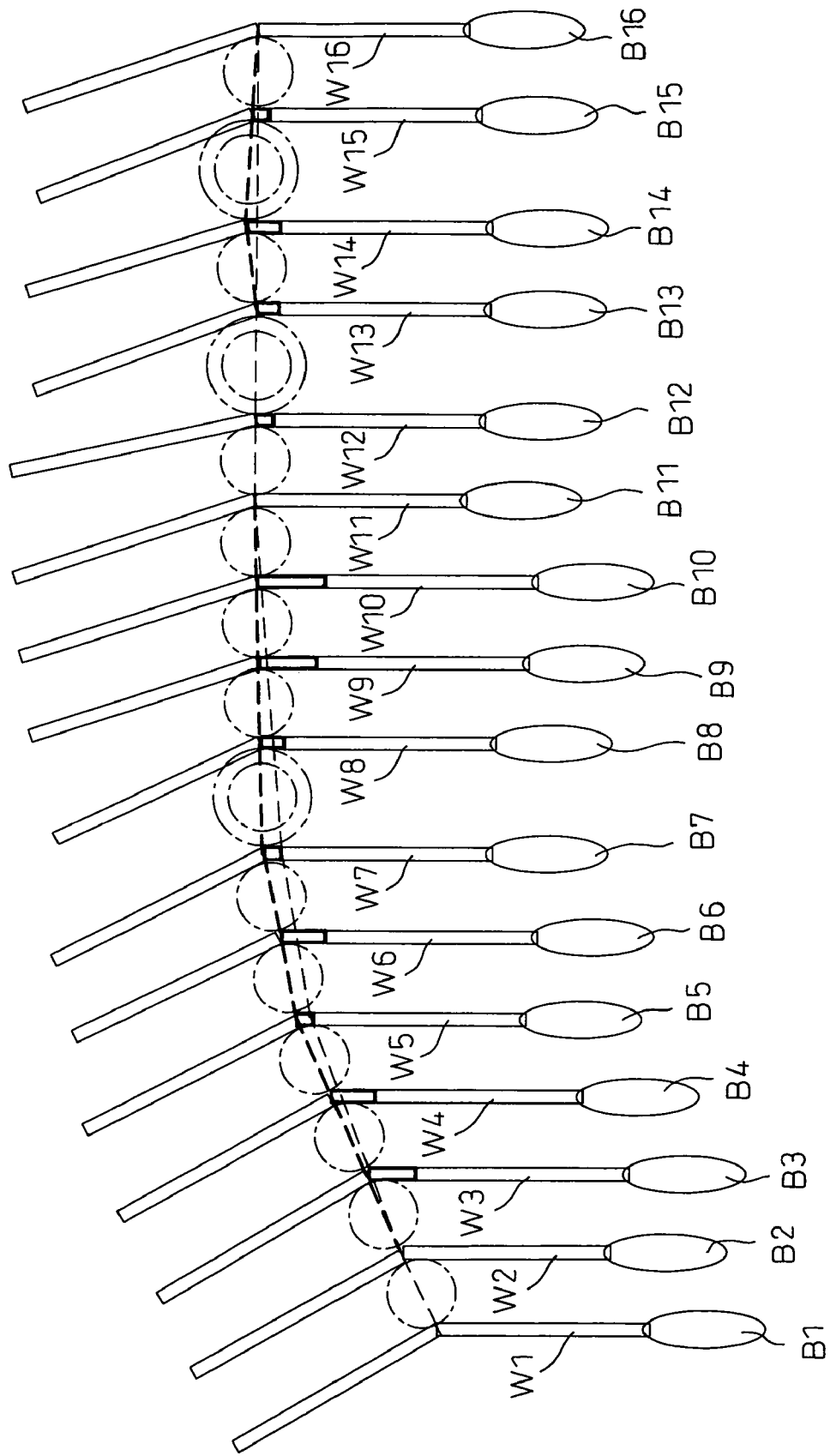
FIG. 12 is a diagram showing a specific example of a tentative target line generated in the tentative determination step in the automatic trace determination method according to the first embodiment of the present invention.
Figure 13:
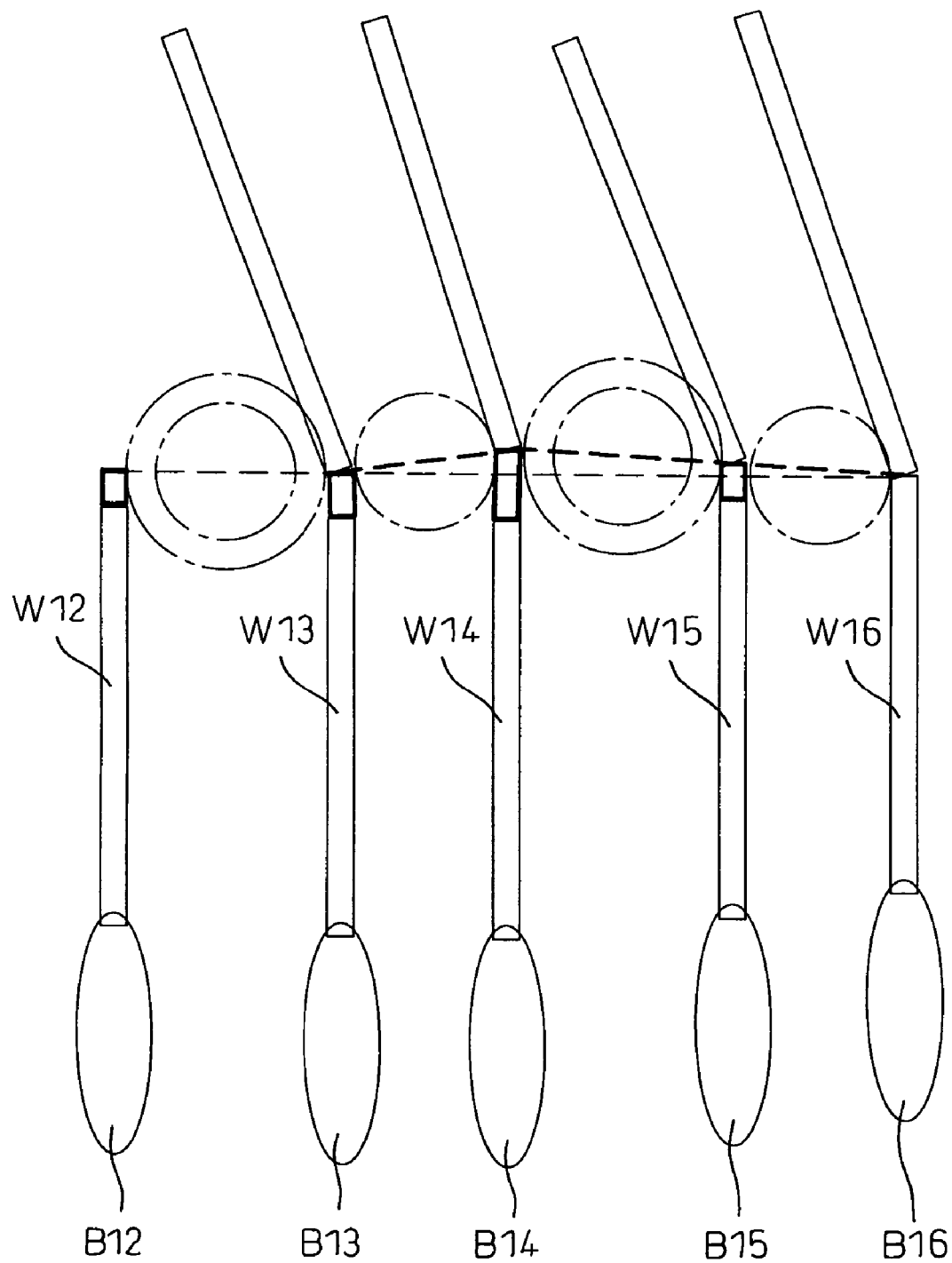
FIG. 13 is a diagram in which a portion of FIG. 12 is enlarged.

A specific example of the above-described correction operation for securing the clearances between the adjacent traces in the final determination step S200 will be shown as follows. FIG. 12 is a diagram showing a specific example of a tentative target line generated in the tentative determination step in the automatic trace determination method according to the first embodiment of the present invention, and FIG. 13 is a diagram in which a portion of FIG. 12 is enlarged. It is assumed that the tentative target line designated by a dotted line in these figures is provided in advance.

Because the clearances between the traces W2-W7 are not secured sufficiently, in the final correction operation, the initial tentative target line is moved in the direction in which the minimum traces are drawn out so as to generate a new target line designated by a bold dotted line in the figure. At this time, the traces W3-W7 are extended so as to reach the new target line. On the other hand, though the clearances between the traces W7-W11 are secured sufficiently, in order to avoid deviation from the new target line drawn up to the trace W7 as described above, a new target line, which is designated by a bold dotted line in the figure, is generated also with respect to a portion of the initial tentative target line for the traces W7-W11. At this time, the traces W8-W10 are extended so as to reach the new target line.

Further, because the clearances between the traces W13 and W14 are not sufficiently secured, in the final correction operation, the initial tentative target line is moved in the direction in which the minimum traces are drawn out so as to generate a new target line designated by a bold dotted line in the figure. At this time, the traces W14 is extended so as to reach the new target line. On the other hand, though the clearances between the traces W14-W16 are secured sufficiently, in order to avoid deviation from the new target line drawn up to the trace W14 as described above, a new target line, which is designated by a bold dotted line in the figure, is generated also with respect to the initial tentative target line for the traces W14-W16. At this time, the trace W15 is extended so as to reach the new target line.

Next, a correction operation for securing clearances between traces and vias in the final determination step S200 will be described.

Figure 14:
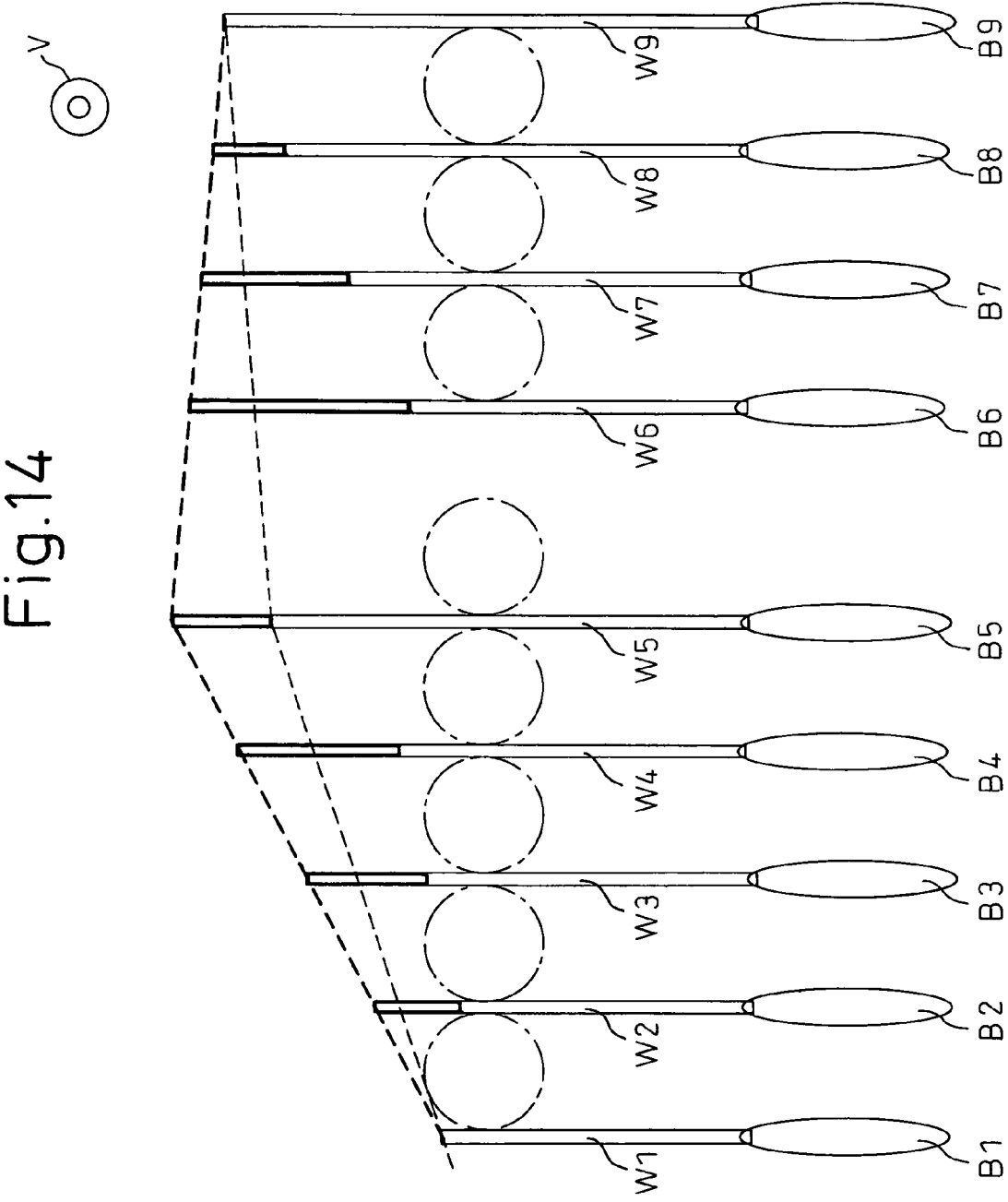
FIG. 14 is a diagram showing an example of problems associated with clearances between traces and vias.

FIG. 14 is a diagram showing an example of problems associated with clearances between traces and vias. Here, because the clearances between the traces W1-W5 and the clearances between the traces W6-W9 are not secured sufficiently, it is assumed that the tentative target line (designated by a dotted line in the figure) that has been generated in the tentative determination step S100 is corrected and the target line designated by a bold dotted line in the figure is already obtained. The clearances between the traces can be secured by bending the traces at bending points provided on the target line. However, if the traces are bent at the bending points located on the target line obtained after the correction, the clearances between the trace W8 and the respective via cannot be sufficiently secured. This is because the vias are typically remote from the pads in the direction in which the traces are drawn out and, therefore, the new target line generated by the operation in the correction step S202 of FIG. 11 is moved from the initial tentative target line in the direction in which the traces are drawn out. Thus, the new target line generated by the operation in the correction step S202 of FIG. 11 is nearer to the vias than the initial target line and, as a result, the clearances between the traces and vias become insufficient. Therefore, a correction operation described below will be performed in this embodiment.

Figure 15:
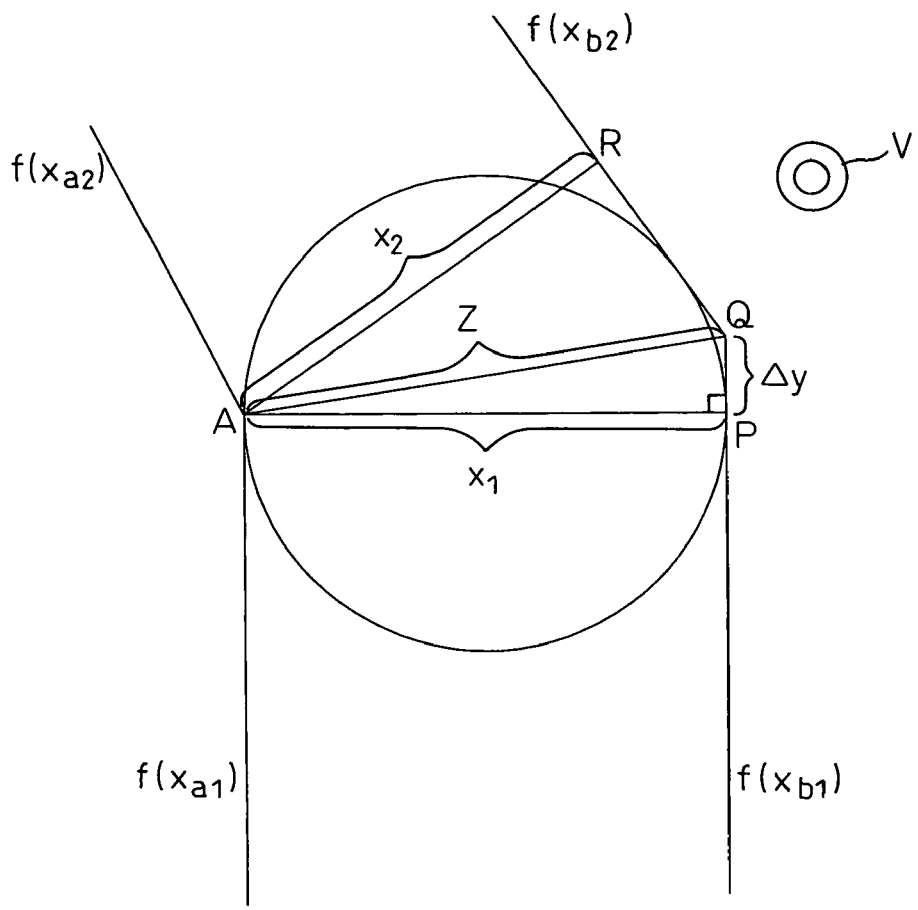
FIG. 15 is a diagram (part 1) for describing a principle of a correction operation for securing clearances between traces and vias in the final determination step in the automatic trace determination method according to the first embodiment of the present invention.

FIG. 15 is a diagram (part 1) for describing a principle of a correction operation for securing clearances between traces and vias in the final determination step in the automatic trace determination method according to the first embodiment of the present invention. In this figure, a portion of the new target line assumed here is defined as a segment AQ and the length of this segment AQ is assumed to be z. Here, this new target line is defined here by somewhat moving the tentative target line generated in the tentative determination step S100 in the direction in which the minimum traces are drawn out. Further, the segment PQ is an extended part of the trace that is extended up to the new target line as described above and the length of this segment PQ is defined as Ay. Further, assuming that points A and Q are bending points, $f(x_{a1})$ and $f(x_{b1})$ are function expressions of the traces before bending and $f(x_{a2})$ and $f(x_{b2})$ are function expressions of the traces after bending. In this figure, the trace expressed by the function expression $f(x_{b2})$ is subject to check about the clearance from the via V. Further, the segment AP is the distance between the traces $f(x_{a1})$ and $f(x_{b1})$ and its length is designated as x1. The segment AR is the distance between the traces $f(x_{a2})$ and $f(x_{b2})$ and its length is designated as x2. Here, the circle in this figure is a clearance check circle used for checking the clearances between the traces. This clearance check circle is in contact with the traces $f(x_{a1})$ and $f(x_{b1})$ at the points A and Q, respectively, and therefore <APQ is a right angle.

Here, assuming that the minimum clearance between the traces is min(c), following relational expressions (1) and (2) are obtained.

$$z > x1 > \min(c) \tag{1}$$

$$z > x2 > \min(c) \tag{2}$$

On the other hand, the following relational expressions (3) and (4) hold for parameters z, $\Delta y$ and x1.

$$z = \cos^{-1} x1 \tag{3}$$

$$\Delta y = \tan^{-1} x1 \tag{4}$$

In order to define the above-mentioned new target line, at least one trace should be extended. In FIG. 15, only the extension of the trace $f(x_{ab1})$ is shown. At this time, when each trace is extended up to the new target line, a summation of the extended lengths of the traces is expressed as $\Sigma \tan^{-1} x1$.

On the other hand, when the target line is defined tentatively so that only minimum necessary clearances between the traces can be secured, a summation of the extended lengths of the traces extended up to this tentative target line is expressed as $\Sigma \tan^{-1} \min(C)$.

Therefore, when the above-mentioned new target line is defined, the traces are extended more than that in the case when the target line is defined tentatively so that only minimum necessary clearances between the traces can be secured by $\Delta d$ expressed by the following expression (5).

$$\Delta d = \Sigma \tan^{-1} x1 - \Sigma \tan^{-1} \min(c) \tag{5}$$

Here, the coordinate of the intersection of the tentative target line generated in the tentative determination step S100 and the trace subject to check about the clearance from the via V in the direction in which the minimum trace in question is drawn out is defined as ya. On the other hand, the coordinate of the point that can secure the minimum necessary clearance from the via V, which is the reference for checking the clearance, in the direction in which the minimum trace is dawn out is referred to as the via clearance coordinate value and defined as yc in this specification. At this time, if the following relational expression (6) is satisfied, the clearance between the trace $f(x_{ab2})$ and the via V can be secured and a clearance error does not occur.

$$yc > ya + \Sigma \tan^{-1} x1 \tag{6}$$

As described above, the above-mentioned new target line is obtained by somewhat moving the tentative target line generated in the tentative determination step S100 in the direction in which the minimum trace is drawn out. Therefore, if, after this movement, the clearance error occurs with respect to the trace that is bent according to the above-mentioned new target line, this means that the tentative target line generated in the tentative determination step S100 is moved too much in the direction in which the minimum trace is drawn out.

For this reason, it is to be understood that the clearance error can be resolved by returning the above-mentioned new target line in the opposite direction to that in which the minimum trace is drawn out by a distance that is required for securing the clearance between the trace $f(x_{ab2})$ and the via V. This distance is referred to as "the returning distance" and defined by a parameter m in this specification. The returning distance m can be expressed by the following expression (7).

$$m = \Delta d - \{(ya + \Sigma \tan^{-1} x1) - yc\} \tag{7}$$

The expression (8) can be obtained by simplifying the expression (7) using the expression (5).

$$m = yc - ya - \Sigma \tan^{-1} \min(c) \tag{8}$$

Thus, the returning distance can be calculated by subtracting the parameter that is the summation of the extended lengths of the minimum traces when the minimum traces are extended up to the tentative target line so as to secure the minimum necessary clearances from the traces, and the parameter that is the coordinate of the intersection of the tentative target line tentatively determined in the tentative determination step S100 and the extended minimum trace subject to the clearance check in the direction in which the minimum trace is drawn out, from the parameter that is the coordinate of the point that can secure the minimum necessary clearance from the via V that is the reference for checking the clearance in the direction in which the minimum trace is drawn out.

Figure 16:
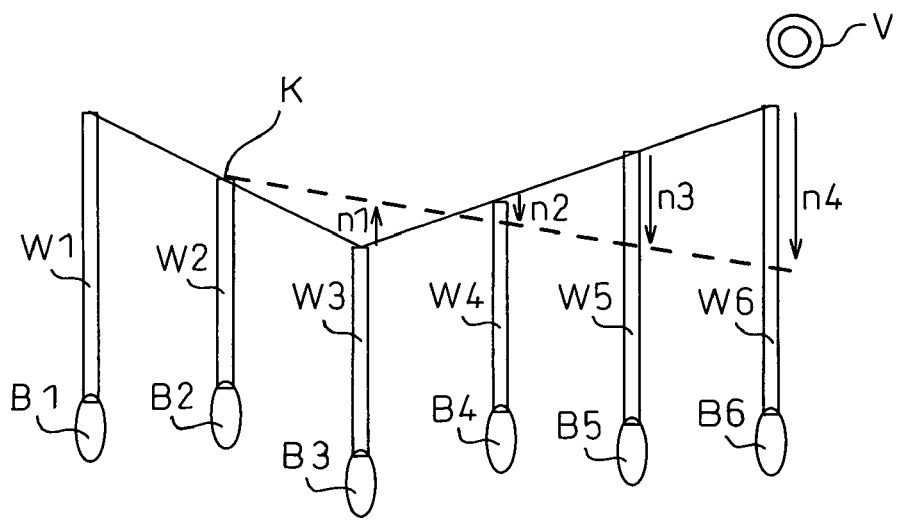
FIG. 16 is a diagram (part 2) for describing a principle of a correction operation for securing clearances between traces and vias in the final determination step in the automatic trace determination method according to the first embodiment of the present invention.

The returning distance m calculated as described above is a parameter depending on the summation of the extended lengths of the traces and, according to the returning distance, the clearance error can be resolved by replacing a portion of the initial tentative target line with the new target line. This operation will now be described. FIG. 16 is a diagram (part 2) for describing a principle of a correction operation for securing clearances between traces and vias in the final determination step in the automatic trace determination method according to the first embodiment of the present invention. In this figure, it is assumed that the initial target line cannot secure the clearance, in particular, between the trace W6 and the via V after bending the trace and the returning distance m is a value that can resolve this clearance error and, further, the new target line that can resolve this clearance error is a line designated by a bold dotted line in the figure.

The traces W3-W6 have to be extended or shortened from the initial target line up to the new target line that can resolve the clearance error. At this time, assuming the lengths of the extended or shortened portions of the traces W3-W6 as n1-n4, the relationship between the parameters n1-n4 and the moving distance m can be expressed by the following expression (9). Here, it is to be noted that the parameter n1-n4 includes a concept of the direction in which the traces are extended or shortened and the direction is represented by the orientations of arrows in FIG. 16.

$$m = n1 + n2 + n3 + n4 \tag{9}$$

Thus, the clearance error between the trace and the via can be resolved if a target line that can satisfy the expression (9) or, in other words, a target line that can secure the returning distance is found. Therefore, a starting point of the new tentative target line that can secure the returning distance m and that coincides with a bending point of at least one minimum trace is calculated. Then, an operation similar to that in the tentative determination step S100 is performed again with respect to the new target line having this starting point and, then, an operation similar to that in the final determination step S200 is performed again with respect to the new tentative target line obtained by performing the tentative determination step S100 again as described above so that the final target line can be regenerated.

Figure 17:
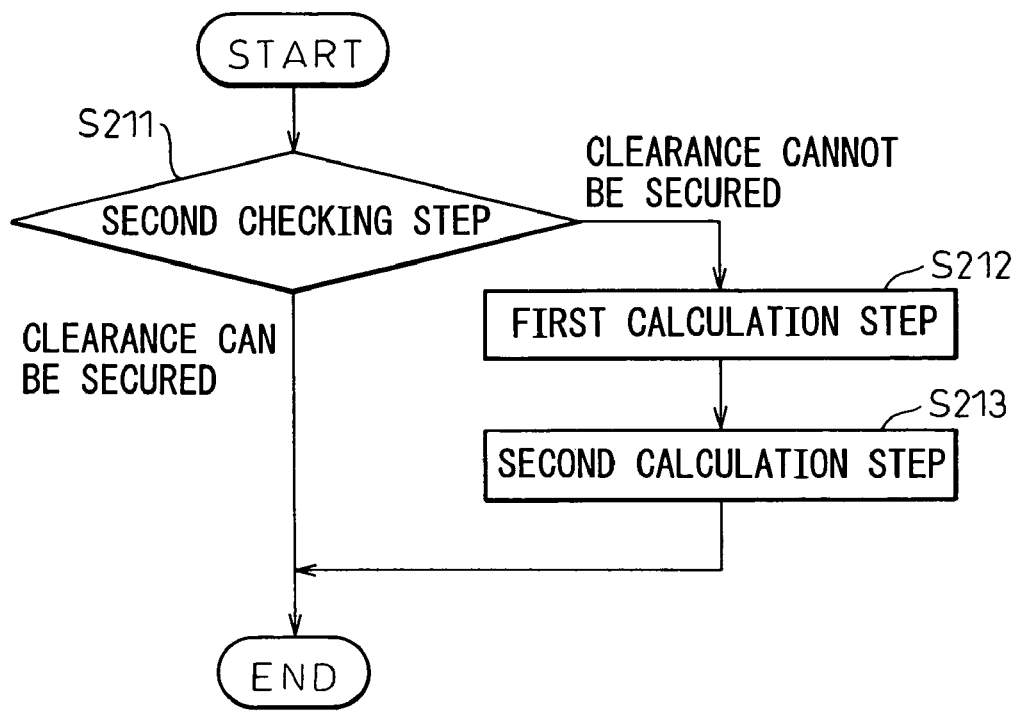
FIG. 17 is a flow chart showing an operational flow of a correction operation for securing clearances between traces and vias in the final determination step in the automatic trace determination method according to the first embodiment of the present invention.

FIG. 17 is a flow chart showing an operational flow of a correction operation for securing clearances between traces and vias in the final determination step in the automatic trace determination method according to the first embodiment of the present invention.

First, in a second checking step S211, it is determined whether a clearance between a minimum trace and an adjacent via can be secured when the minimum trace is bent at a bending point on a tentative target line or not.

If it is determined that the clearance between the trace and the adjacent via cannot be secured in the second checking step S211, in a first calculation step S212, a returning distance in the opposite direction to that in which the minimum trace is drawn out that is required to secure the clearance is calculated. Here, in this first calculation step S212, assuming a first parameter that is a summation of the extended lengths of the minimum traces when the minimum traces are extended up to the tentatively determined target line so that the minimum necessary clearance between the traces can be secured, a second parameter that is the coordinate of the intersection of the tentative target line tentatively determined in the tentative determination step and the extended minimum trace that is extended in the direction in which the minimum trace is drawn out and that is subject to the clearance check, and a third parameter that is the coordinate of the position that can secure the minimum necessary clearance from the via that is a reference for checking the clearance in the second checking step in the direction in which the minimum trace is drawn out, the returning distance is calculated by subtracting the first and second parameters from the third parameter.

Next, in a second calculation step S213, a starting point of the new tentative target line that can secure the necessary returning distance and that coincides with a bending point of at least one of the minimum traces is calculated.

An operation similar to that in the tentative determination step is performed again with respect to the new tentative target line having the starting point calculated in the second calculation step S213 and an operation similar to that in the final determination step is performed again with respect to the new tentative target line obtained by performing the tentative determination step again so that the new final target line can be regenerated.

On the other hand, if it is determined that the clearances between the traces and the adjacent vias can be secured in the second checking step S211, the target line at this time is determined as the final target line without correction.

The positions of the intersections of the final target line determined as described above and the traces from the respective pads are determined as the bending points of the traces in question. As a result, the wiring pattern in which the traces are bent at such bending points becomes a "beautiful" pattern with order and regularity. Thus, according to the present invention, a wiring pattern with order and regularity can be determined automatically by computation.

If the wiring pattern obtained as described above is distributed on a substrate uniformly and symmetrically, it can be said to be of higher quality. In this case, for example, the substrate is deformed substantially uniformly due to heat and, therefore, there is an effect in that wiring errors such as a short circuit or break of traces are not likely to occur. In order to achieve a symmetrical pattern, the pads at both ends of a series of pads aligned substantially in a line may be defined as starting points of computation to perform the tentative determination step S100 and the final determination step S200 described above so that the final target line can be determined. However, the junction of the two final target lines obtained by performing the tentative determination step S100 and the final determination step S200 from the both ends of the series of pads may not be aligned with any minimum traces. In such case, one final target line may be bent further at a position where this line changes its direction so that this line coincides with the other final target line on at least one minimum trace. A specific example of such adjustment will be described as follows.

Figure 18:
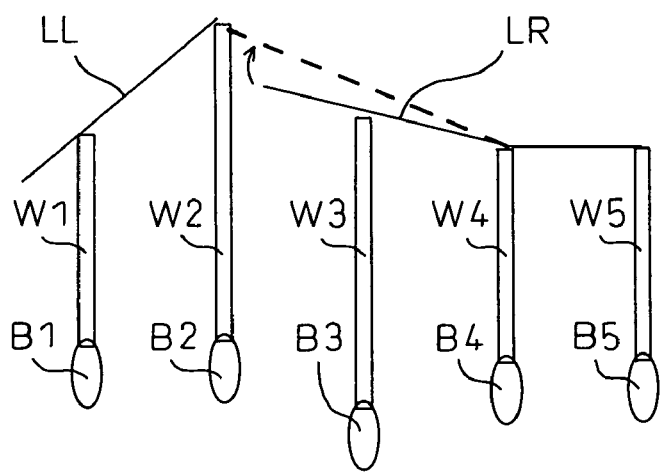
FIG. 18 is a diagram illustrating a difference between two final target lines that may occur when both ends of a series of pads are defined as starting points of computation in both tentative and final determination steps according to the first embodiment of the present invention.

FIG. 18 is a diagram illustrating a difference between two final target lines that may occur when both ends of a series of pads are defined as starting points of computation in both tentative and final determination steps. Here is shown an example in which, when the tentative determination step and the final determination step are performed from both the left and right sides of this figure, the junction of the two final target lines LL and LR obtained by the operations from both the left and right sides is not aligned with any minimum trace. In such case, a new final target line that is designated by a bold dotted line may be generated by further bending the final target line LR at a bending point of the trace W4 so that it coincides with the final target line LL on the trace W2.

As described above, according to the first embodiment of the present invention in which the position of intersection of the final target line and the trace from the pad is defined as the bending point of the trace in question, a wiring pattern with order and regularity can be determined automatically by computation. In this connection, if a clearance error does not occur when the traces are bent at positions on the tentative target line tentatively determined in the tentative determination step, it is not necessary to perform the final determination step described above and the tentative target line may be defined as the final target line and the position of intersection of the final target line and the trace from the pad may be defined as the bending point of the trace in question.

Next, according to a second embodiment of the present invention that will be described below, the first embodiment of the present invention may further comprise computation that may reflect the designer's intention to some extent.

Figure 19:
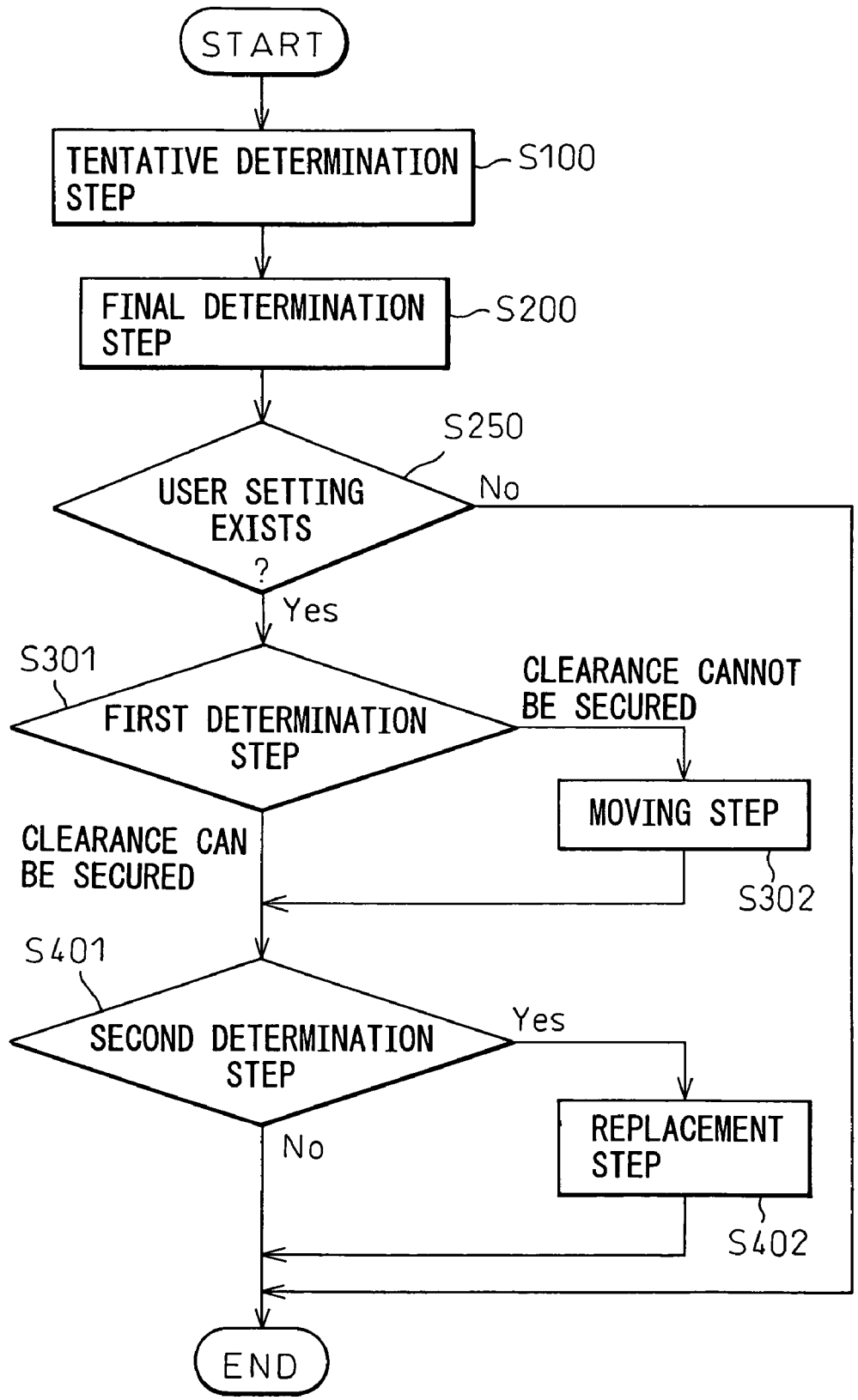
FIG. 19 is a flow chart showing an operational flow of an automatic trace determination method according to a second embodiment of the present invention.
Figure 20:
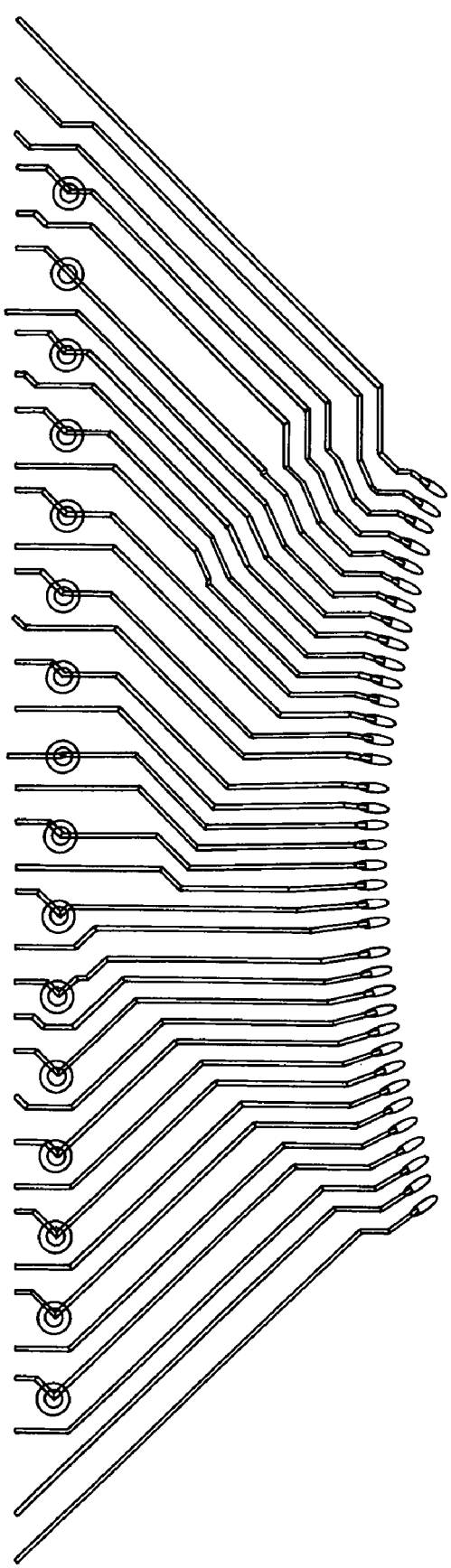
FIG. 20 is a diagram illustrating an example of traces arranged on a substrate without order and regularity.
Figure 21:
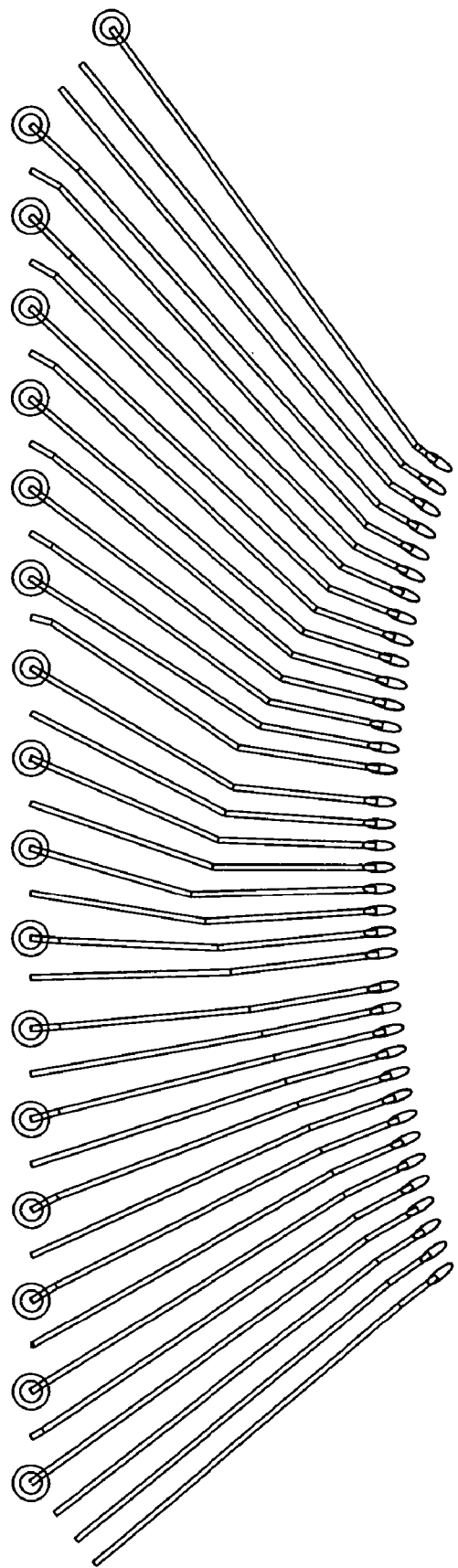
FIG. 21 is a diagram illustrating an example of traces arranged on a substrate with order and regularity.
Figure 23:
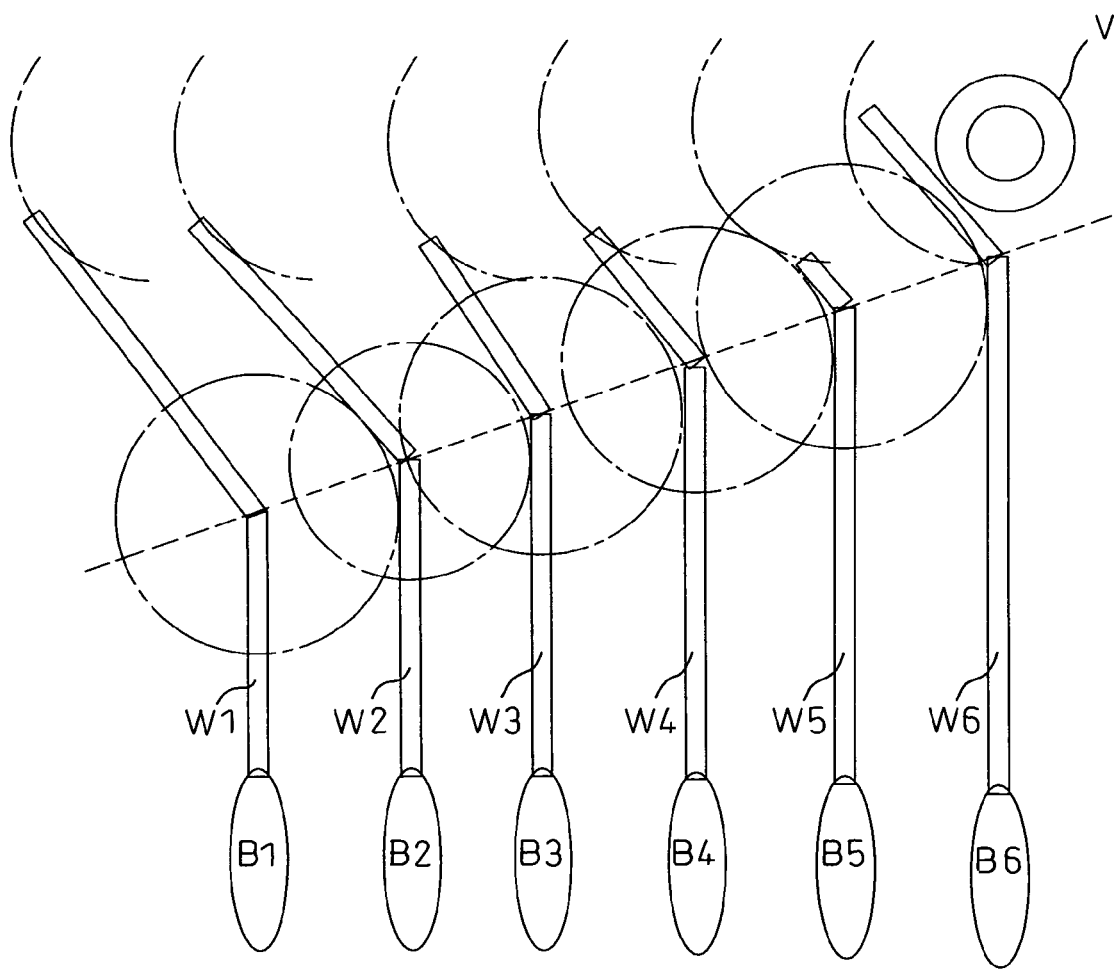
FIG. 23 is a diagram (part 1) for describing a specific example of a related-art manual pattern design by trial and error.
Figure 24:
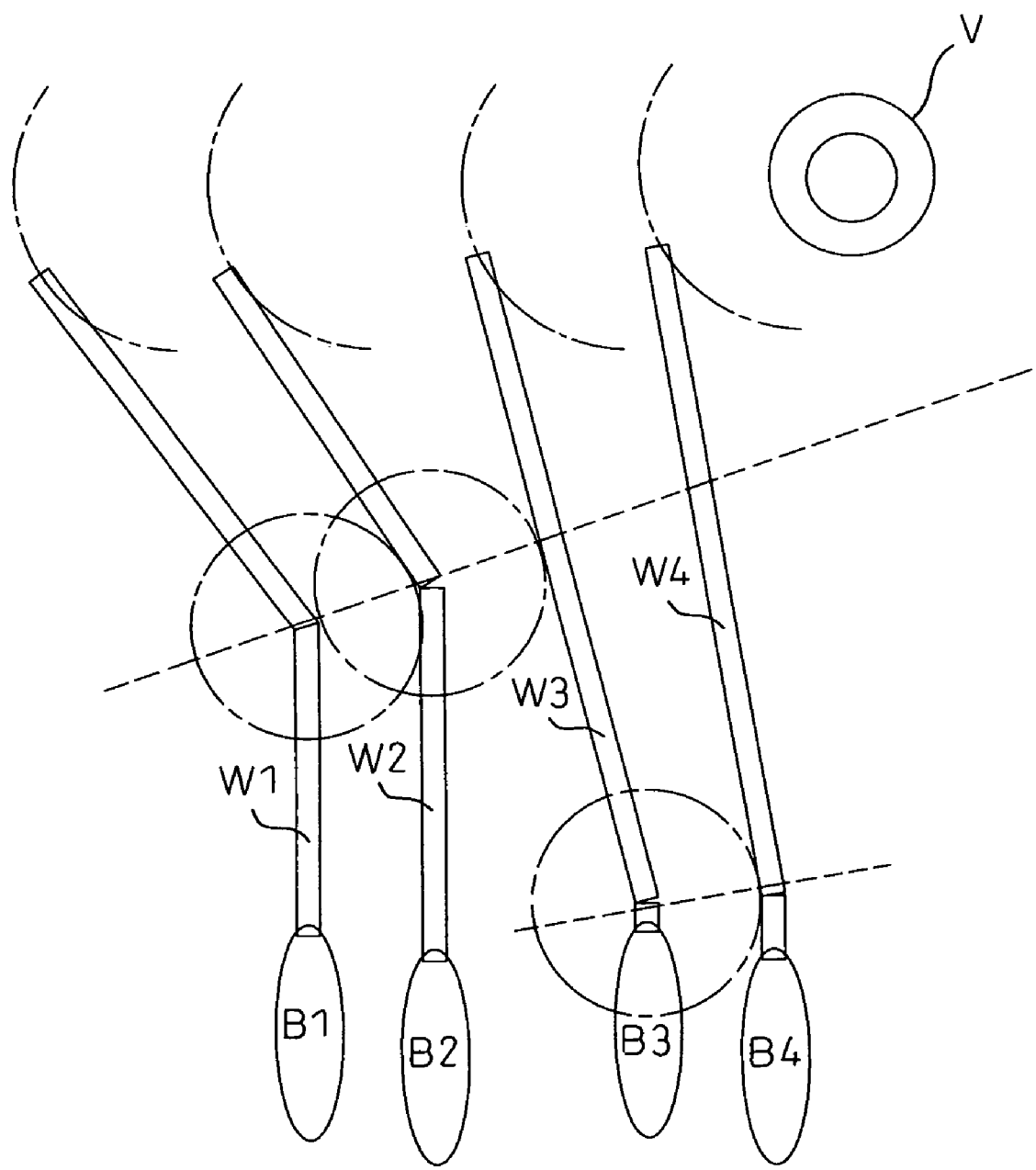
FIG. 24 is a diagram (part 2) for describing a specific example of a related-art manual pattern design by trial and error.
Figure 25:
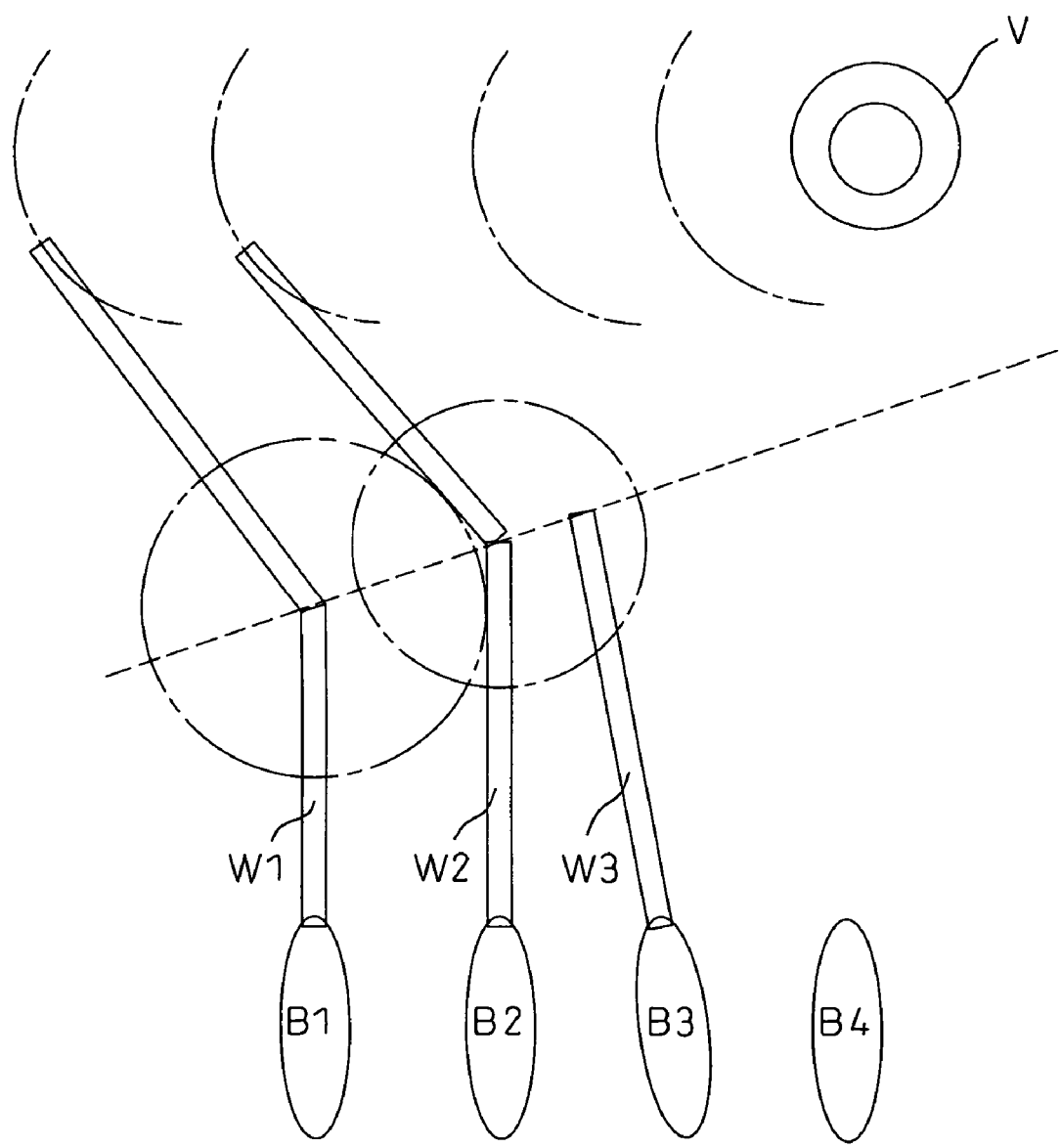
FIG. 25 is a diagram (part 3) for describing a specific example of a related-art manual pattern design by trial and error.
Figure 26:
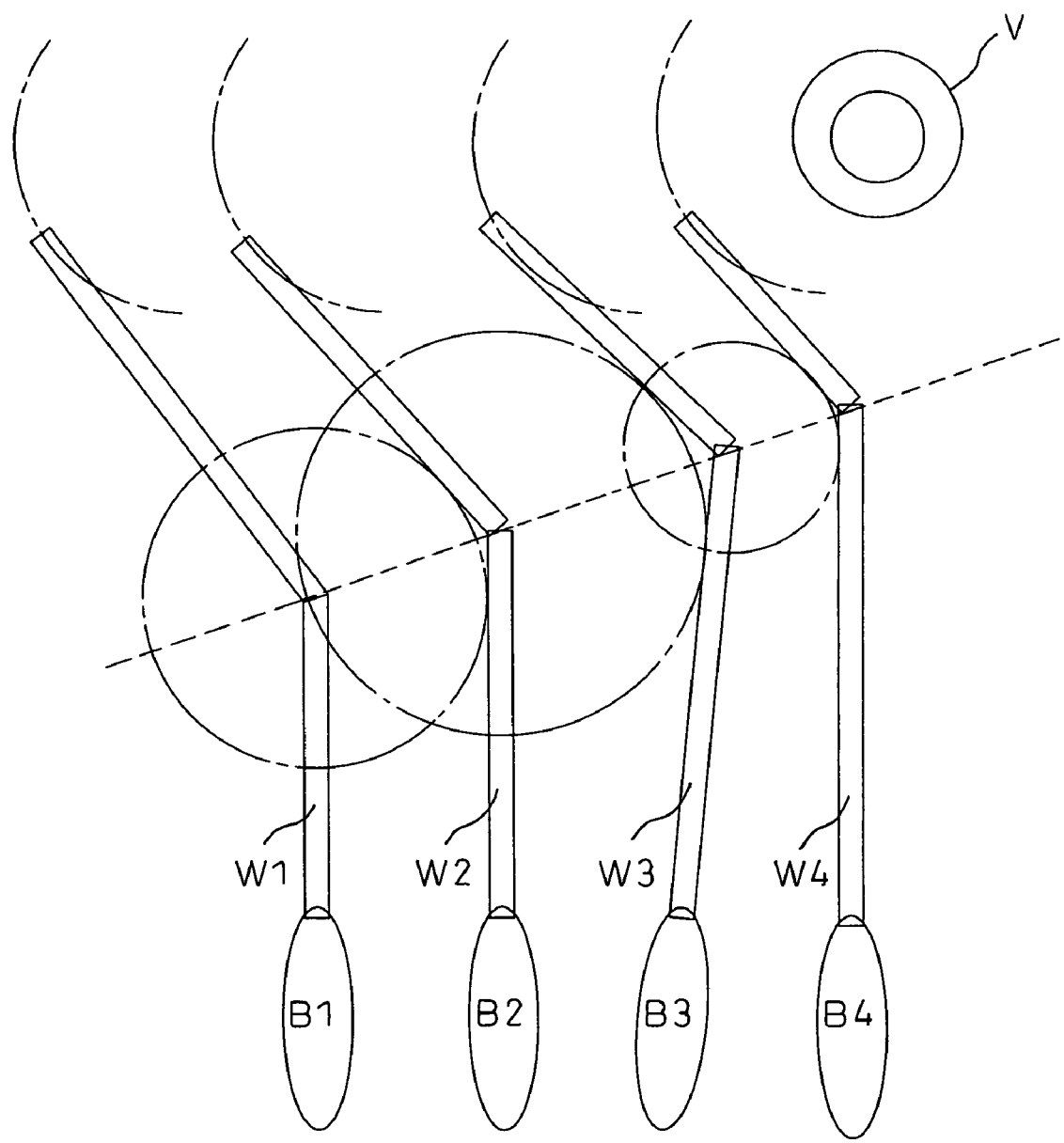
FIG. 26 is a diagram (part 4) for describing a specific example of a related-art manual pattern design by trial and error.

FIG. 19 is a flow chart showing an operational flow of an automatic trace determination method according to a second embodiment of the present invention.

First, in a manner similar to that in the first embodiment, the tentative determination step S100 and the final determination step S200 are performed. Then, in step S250, it is determined whether there is a user setting to change at least a portion of the final target line generated in the final determination step S200 or not. If there is such user setting, the operation proceeds to a first determination step S301. If there is not such user setting, a result similar to that of the first embodiment described above can be obtained.

In the first determination step S301, it is determined whether the clearances between the traces passing through the bending points on the specified target line specified arbitrarily and the vias adjacent to the respective traces can be secured or not. If the clearances cannot be secured, the operation proceeds to a moving step S302 and, if the clearances can be secured, the operation proceeds to a second determination step S401.

In the moving step S302, the specified target line is moved in the opposite direction to that in which the minimum trace is drawn out so that at least the clearance can be secured.

In the second determination step S401, it is determined whether the specified target line includes a portion that is farther from the pads than the final target line determined in the final determination step S200 in the direction in which the minimum traces are drawn out or not. If there is such a portion, the operation proceeds to a replacement step S402 and, on the other hand, if there is not such a portion, this specified target line is not adopted.

In the replacement step S402, a portion of the final target line determined in the final determination step S200 is replaced with the corresponding portion that is farther from the pads than the final target line determined in the final determination step S200 in the direction in which the traces are drawn out to determine as a portion of the new final target line.

The tentative determination step S100, the final determination step S200, the step S250, the first determination step S301, the moving step S302, the second determination step S401 and the replacement step S402 according to the second embodiment of the present invention are performed by a processor such as a computer.

As described above, according to the present invention, in pattern design of semiconductor packages such as PBGA and EBGA, a wiring pattern with order and regularity or, in other words, a "beautiful" wiring pattern can be designed automatically using a processor such as a computer. For example, according to the present invention, a computation result, which was obtained through a half or full day's work in a trial-and-error manner in the related-art pattern design techniques, can be obtained automatically only a few minutes after design data is input to the processor.

According to the first and second embodiments of the present invention, a wiring pattern with a stable quality can be designed in a short time readily without being influenced by the designer's skill, experience, intuition and the like. Because manual design work by trial and error as in the related art becomes unnecessary and, as a result, even if a complicated wiring pattern is required, a high-quality wiring pattern with order and regularity can be achieved in a short time. As a result of the reduction of design time and the burden on the designer, manufacturing costs of the semiconductor packages can also be reduced.

Further, according to the second embodiment of the present invention, the designer's intention may be reflected so that a high-quality wiring pattern with order and regularity can be designed in a short time and readily.

What is claimed is:

1. An automatic trace determination apparatus for automatically determining optimal positions of traces from pads to corresponding vias on a substrate using computation comprises:
   tentative determination means for determining a tentative target line with which tentative positions of bending points of traces are aligned; and
   final determination means for determining a final target line by correcting said tentative target line so that clearances between adjacent traces and clearances between said traces and vias adjacent to corresponding traces can be secured,
   wherein positions of intersection of said determined final target line and said traces from the pads are determined as said bending points of said traces.

2. The automatic trace determination apparatus according to claim 1, further comprising:
   moving means that, when clearances between said traces passing through bending points on a target line specified arbitrarily and adjacent vias cannot be secured, moves said specified target line in an appositive direction in which minimum traces are drawn out so that at least the clearances can be secured; and
   replacement means that replaces a portion of said final target line determined by said final determination means with a portion of said specified target line that can secure said clearances or that is moved to secure at least said clearances that cannot be otherwise secured and that is farther from said pads in the direction in which said minimum traces are drawn out than said final target line determined by said final determination means and determines the latter as a portion of a new final target line.

3. The automatic trace determination apparatus according to claim 1, wherein said tentative determination means further comprises:
   selection means that, when coordinates of end portions of specific minimum traces drawn out in a specific identical direction from respective pads with respect to the direction in which said minimum traces are drawn out are defined as those of the highest points, selects segments that are farthest from said pads with respect to the direction in which said minimum traces are drawn out; and
   generation means that generates said tentative target line by connecting said segments selected by said selection means.

4. The automatic trace determination apparatus according to claim 3, wherein said tentative determination means further comprises:
   first extension means for extending said minimum traces drawn out in a direction different from said specific identical direction to a position that can maintain clearances from other of said minimum traces; and
   second extension means for bending said minimum traces extended by said first extension means in said specific identical direction at positions where said clearances can be maintained and, then, extending said minimum traces up to said tentative target line.

5. The automatic trace determination apparatus according to claim 1, wherein said final determination means further comprises:
   first checking means for checking whether clearances between said adjacent traces can be secured when the traces from minimum traces are bent at said bending points on said tentative target line; and
   correction means for correcting said tentative target line by moving it in the direction in which said minimum traces are drawn out so that at least said clearances can be secured at said bending points when it is determined that said clearances cannot be secured by said first checking means.

6. The automatic trace determination apparatus according to claim 5, wherein said final determination means further comprises third extension means for extending said minimum traces up to said corrected tentative target line obtained by said correction means.

7. The automatic trace determination apparatus according to claim 6, wherein said final determination means further comprises:
   second checking means for determining whether clearances between said traces and said vias adjacent to said traces can be secured or not when the traces from said minimum traces are bent at said bending points on said tentative target line;
   first computation means for calculating a returning distance in the opposite direction in which said minimum traces are drawn out that is required for securing said clearances when it is determined that said clearances cannot be secured by said second checking means; and
   second calculation means for calculating a starting point of a new tentative target line that can secure a necessary returning distance and that coincides with a bending point of at least one of said minimum traces, and wherein an operation similar to that in said tentative determination means is performed again with respect to said new tentative target line having a starting point calculated by said second calculation means and an operation similar to that in said final determination means is performed again with respect to said new tentative target line obtained by performing the operation again in said tentative determination means so that said final target line is generated.

8. The automatic trace determination apparatus according to claim 7, wherein said first calculation means calculated said returning distance based on:

a first parameter that is a summation of extended lengths of said minimum traces when said minimum traces are extended up to said tentative target line tentatively determined so that at least said clearances between the traces can be secured;

a second parameter that is a coordinate of intersection of said tentative target line tentatively determined by said tentative determination means and said extended minimum trace that is subject to clearance check in the direction in which said minimum trace is drawn out; and a third parameter that is a coordinate of a position that can at least secure clearance from a via that is a reference for checking the clearance by said second checking means in the direction in which said minimum trace is drawn out.

9. The automatic trace determination apparatus according to claim 8, wherein said first calculation means calculates said returning distance by subtracting said first parameter and said second paremeter from said third parameter.

10. The automatic trace determination apparatus according to claim 1, wherein both ends of a series of pads aligned substantially in a line are defined as starting points of computation to perform operations by said tentative determination means and said final determination means so that said final target line can be determined.

11. The automatic trace determination apparatus according to claim 10, further comprising an adjustment means that, when intersection of two said final target lines obtained by performing the operations by said tentative determination means and said final determination means from said both ends of said series of pads are not aligned with any of said minimum traces, one of said final target lines is further bent at a position where another one of said final target lines turns its direction so that the one of said final target lines coincides with the another one of said final target lines on one of said minimum traces.

* * * * *

UNITED STATES PATENT AND TRADEMARK OFFICE
CERTIFICATE OF CORRECTION

PATENT NO. : 7,469,397 B2  Page 1 of 1
APPLICATION NO. : 11/243879
DATED : December 23, 2008
INVENTOR(S) : Tamotsu Kitamura It is certified that error appears in the above-identified patent and that said Letters Patent is hereby corrected as shown below:

In the cover page, under the "OTHER PUBLICATIONS" item [56] col. 2, line 2, please delete "English language Abstract for JP10-214809, 1998."

In column 15, line 63 (claim 2), please delete "at least"; and

In column 18, line 7 (claim 9), please delete "paremeter", and insert therefore -- parameter --.

Signed and Sealed this

Eleventh Day of August, 2009

David J. Kappos
*Director of the United States Patent and Trademark Office*